United States Patent [19]

Iizuka et al.

[11] Patent Number: 5,278,698
[45] Date of Patent: Jan. 11, 1994

[54] MAGNIFYING PROJECTING LENS

[75] Inventors: Takashi Iizuka; Nobutaka Minefuji; Yasunori Arai, all of Tokyo; Kazushi Yoshida, Shizuoka, all of Japan

[73] Assignee: Asahi Kogaku Kogyo Kabushiki Kaisha, Tokyo, Japan

[21] Appl. No.: 15,283

[22] Filed: Jan. 27, 1993

Related U.S. Application Data

[63] Continuation of Ser. No. 722,522, Jun. 27, 1991, abandoned.

[30] Foreign Application Priority Data

Jul. 6, 1990 [JP] Japan ................... 2-178658
Sep. 21, 1990 [JP] Japan ................... 2-253026
Oct. 1, 1990 [JP] Japan ................... 2-263651

[51] Int. Cl.⁵ .......... G02B 9/12; G02B 13/04; G02B 15/177
[52] U.S. Cl. .................. 359/682; 359/651; 359/689; 359/751; 359/753
[58] Field of Search .............. 359/749–753, 680–682, 649–651, 739, 740, 770, 689, 691, 676

[56] References Cited

U.S. PATENT DOCUMENTS

| | | | |
|---|---|---|---|
| 4,824,223 | 4/1989 | Doctor et al. | 359/689 |
| 4,838,666 | 6/1989 | Shiraishi | 359/689 |
| 4,934,794 | 6/1990 | Ueda | 359/740 |
| 4,938,572 | 7/1990 | Iwasaki | 359/740 |
| 4,957,355 | 9/1990 | Sato | 359/749 |
| 4,993,814 | 2/1991 | Hata | 359/691 |
| 5,015,077 | 5/1991 | Ueda | 359/680 |
| 5,042,929 | 8/1991 | Tanaka et al. | 359/752 |

FOREIGN PATENT DOCUMENTS

| | | | |
|---|---|---|---|
| 143311 | 8/1983 | Japan | 359/689 |
| 232310 | 12/1984 | Japan | 359/753 |
| 1429074 | 10/1988 | Japan | 359/740 |
| 61714 | 3/1989 | Japan | 359/753 |
| 1-188815 | 7/1989 | Japan | |
| 2-284108 | 11/1990 | Japan | |
| 1238668 | 7/1971 | United Kingdom | 359/681 |

Primary Examiner—Jon W. Henry
Attorney, Agent, or Firm—Sandler, Greenblum & Bernstein

[57] ABSTRACT

A magnifying projecting lens has a negative first lens group, a positive second lens group and a positive third lens group that is arranged in this order from a magnifying side. The lens groups are arranged so as to satisfy the following condition:

$fb/f > 1.7$, wherein
fb equals a back focus when an object distance is ∞
f equals a focal length of the lens.

33 Claims, 33 Drawing Sheets

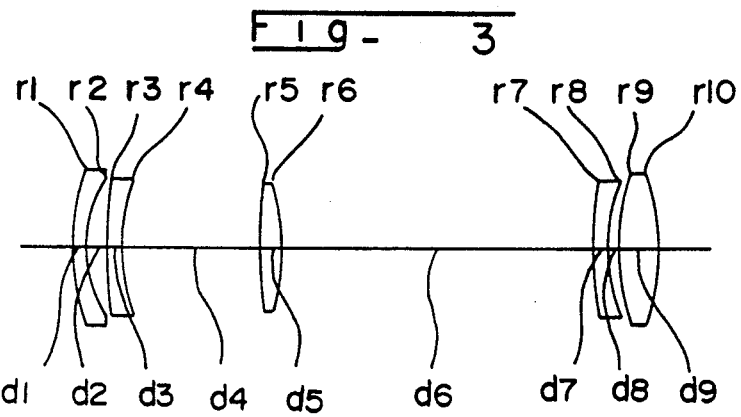
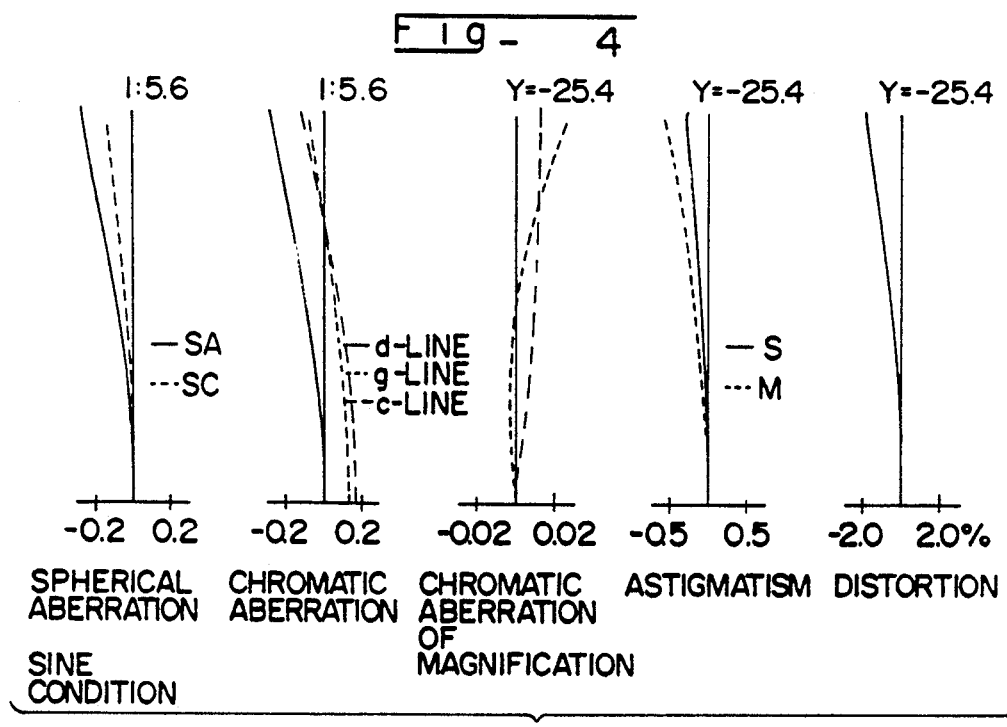

MAGNIFYING PROJECTING LENS

This application is a continuation of application Ser. No. 07/722,522, filed Jun. 27, 1991, now abandoned.

BACKGROUND OF THE INVENTION

1. Field of the Invention

The present invention relates to a magnifying projecting lens which is used in a projector, such as a liquid crystal projector, and more specifically to a projecting lens which requires a long back focus; that is a distance between a surface to-be-projected and the projecting lens.

2. Description of the Prior Art

FIGS. 54 and 55 show optical systems of this kind of projector.

In the optical system shown in FIG. 54, a light beam W emitted from a light source is separated into color components of R(red), G(green) and B(blue) by a dichroic mirror 2. Each component is made incident onto a liquid crystal light bulb 4 after being reflected by a mirror 3. The light beam components R, G and B passing through the liquid crystal light bulbs 4, 4, . . . are overlaped by a dichroic prism 5 and projected onto a screen 7 through a projecting lens 6.

However, the dichroic prism 5 is expensive because the prism requires high accuracy to finish and cement. In general, the method with the dichroic mirror shown in FIG. 55 is put into practice.

In this method, at least two dichroic mirrors are disposed in different positions to make the light beam components R, G and B overlap. A distance between the liquid crystal light bulb 4 and the projecting lens 6 becomes long, to make sure of the space for these dichroic mirrors 8; that is the projecting lens 6 requires a long back focus.

The easiest method to make a back focus of a lens long is to make a focal length of the lens long. However, when the focal length becomes long, the distance between the projecting lens and the screen becomes long. In particular, it is not desirable for a box type projector for projecting from the backside of the screen, because a depth of the projector becomes large even if the optical path is turned.

A retro focus lens has a long back focus in comparison with the focal length. However, the retro focus lens is composed of many pieces and is expensive.

SUMMARY OF THE INVENTION

The present invention has been accomplished in view of the above problem. It is therefore the object of the present invention to provide a magnifying projecting lens and a variable power magnifying projecting lens which has a long back focus in comparison with a focal length without increasing the cost of manufacture and lens pieces.

The magnifying projecting lens according to the present invention consists of a negative first lens group, a positive second lens group and a positive third lens group arranged in this order from a magnifying side; with the following condition being satisfied:

$$fb/f > 1.7$$

wherein,
fb equals a back focus when an object distance is $\infty$
f equals a focal length of the projecting lens.

A variable power magnifying projecting lens according to the present invention consists of a negative first lens group, a positive second lens group and a positive third lens group which comprises one positive lens and one negative lens arranged in this order from the magnifying side; wherein a focal length is changed by changing a distance between the second lens group and the third lens group and moving the whole system; wherein the following condition is satisfied:

$$fbw/fw > 1.7$$

wherein,
fbw equals a back focus in wide side when an object distance is $\infty$
fw equals a focal length in wide side of the projecting lens.

BRIEF DESCRIPTION OF THE DRAWINGS

FIG. 3 is a sectional view of a lens of a second embodiment;

FIG. 4 are various aberration diagrams of the second embodiment;

DETAILED DESCRIPTION OF THE EMBODIMENTS

Figure 1:
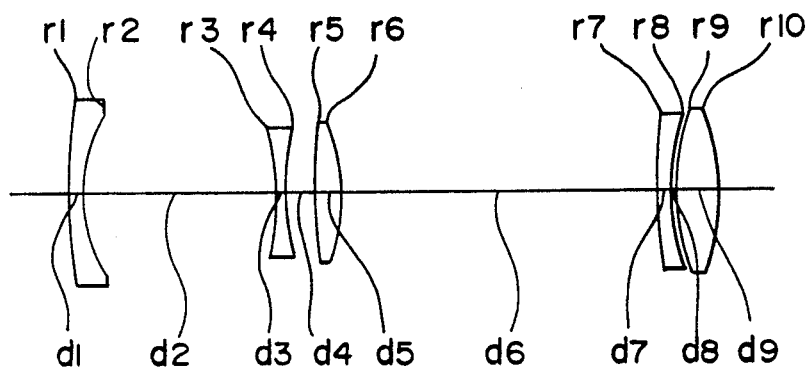
FIG. 1 is a sectional view of a lens of a first embodiment.

The embodiments of the present invention will now be described hereinafter with reference to the drawings. The present disclosure relates to subject matter contained in Japanese patent applications No. HEI2-178658 (filed on Jul. 6, 1990), No. HEI2-253026 (filed on Sep. 21, 1990) and No. HEI2-263651 (filed on Oct. 1, 1990), which are expressly incorporated herein by reference in their entireties.

Embodiments 1 to 10 relate to a magnifying projecting lens of which the focal length is fixed, embodiments 11 to 21 relate to a variable power magnifying projecting lens.

First, the magnifying projecting lens of embodiments 1 to 10 will be described. The magnifying projecting lens of each embodiment consists of a negative first lens group, a positive second lens group and a positive third lens group that are arranged in order from a screen side as a magnifying side, wherein the lens satisfies the following conditions:

$$fb/f > 1.7 \quad (1)$$

$$L/f < 3.5 \quad (2)$$

$$D12/D23 < 1.0 \quad (3)$$

wherein
  fb equals a back focus of the projecting lens,
  f equals a focal length of the projecting
  L equals an overall length of the projecting lens
  D12 equals a distance between the first lens group and the second lens group, and
  D23 equals a distance between the second lens group and the third lens group.

Condition (1) determines the back focus fb in comparison with the focal length f of the projecting lens. When condition (1) is satisfied, a long back focus can be obtained. If fb/f is smaller than 1.7, it is difficult to make sure there is enough space for arranging the dichroic mirror.

Condition (2) determines the overall length L in comparison with the focal length f of the projecting lens. When condition (2) is satisfied, the projecting lens can be made compact. If L/f is lager than 3.5, the overall length becomes too long and a large space is required for disposing the lens.

Condition (3) determines a distance ratio between each lens group. When condition (3) is satisfied, a high imaging performance can be maintained and distortion in the lens can be reduced. If D12 is larger than D23, a distance between a light beam after passing through the first lens group and the optical axis is large, and it is difficult to correct a chromatic aberration of magnification, etc.

In addition, the projecting lenses of embodiments 1 to 6 consist of the first lens group which comprises one or two negative lenses, the second lens group comprises one positive lens, and the third lens group comprises one positive lens and one negative lens. This arrangement is required for satisfying conditions (1) to (3) with minimum lens pieces. The arrangement makes the projecting lens compact, and reduces the cost of the lens.

EMBODIMENT 1

Figure 2:
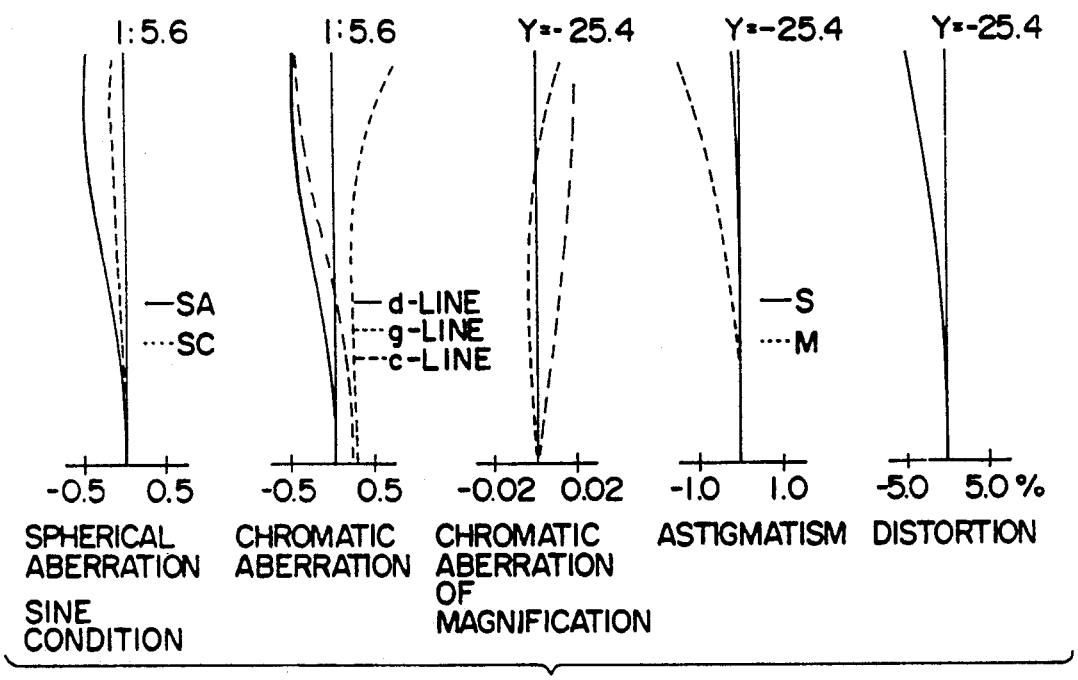
FIG. 2 are various aberration diagrams of the first embodiment.

FIG. 1 shows a magnifying projecting lens of the first embodiment according to the present invention. Concrete numerical constructions are shown in Table 1. Various aberrations in this construction are shown in FIG. 2.

In the table, the reference character FNO. denotes an F number, f denotes a focal length at a wavelength of 588 nm; fb denotes a back focus (i.e.; a distance between the lens and the surface-to-be-projected); m denotes a magnification of the object on the surface-to-be-projected as against the image on the screen; r denotes a radius of curvature of a lens surface; d denotes a lens thickness or a spatial distance; n denotes a refractive index of a lens at a wavelength of 588 nm; and ν denotes ... an Abbe number.

TABLE 1

FNo. = 1:5.6  f = 60.06  fb = 169.98  m = −0.05X

| Surface number | r | d | n | ν |
|---|---|---|---|---|
| 1 | 97.481 | 3.000 | 1.77250 | 49.6 |
| 2 | 33.002 | 40.545 | | |
| 3 | −86.986 | 3.000 | 1.77250 | 49.6 |
| 4 | 66.146 | 6.013 | | |
| 5 | 130.735 | 5.573 | 1.62004 | 36.3 |
| 6 | −42.809 | 67.003 | | |
| 7 | 127.838 | 3.000 | 1.80518 | 25.4 |
| 8 | 47.479 | 0.876 | | |
| 9 | 48.836 | 9.000 | 1.51633 | 64.1 |
| 10 | −55.663 | | | |

EMBODIMENT 2

FIG. 3 shows a magnifying projecting lens of a second embodiment according to the present invention. Concrete numerical constructions are as shown in Table 2. Various aberrations in this construction are shown in FIG. 4.

TABLE 2

FNo. = 1:5.6  f = 60.05  fb = 120.04  m = −0.05X

| Surface number | r | d | n | ν |
|---|---|---|---|---|
| 1 | 54.133 | 3.000 | 1.77250 | 49.6 |
| 2 | 29.618 | 4.660 | | |
| 3 | 136.918 | 3.000 | 1.78590 | 44.2 |
| 4 | 40.106 | 32.379 | | |
| 5 | 207.755 | 4.542 | 1.54814 | 45.8 |
| 6 | −50.975 | 71.416 | | |
| 7 | 113.485 | 3.000 | 1.80518 | 25.4 |
| 8 | 43.393 | 2.029 | | |
| 9 | 48.166 | 9.000 | 1.51633 | 64.1 |
| 10 | −57.863 | | | |

EMBODIMENT 3

Figure 5:
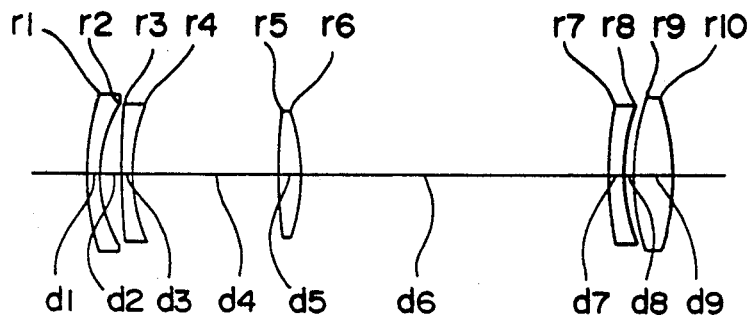
FIG. 5 is a sectional view of a lens of a third embodiment.
Figure 6:
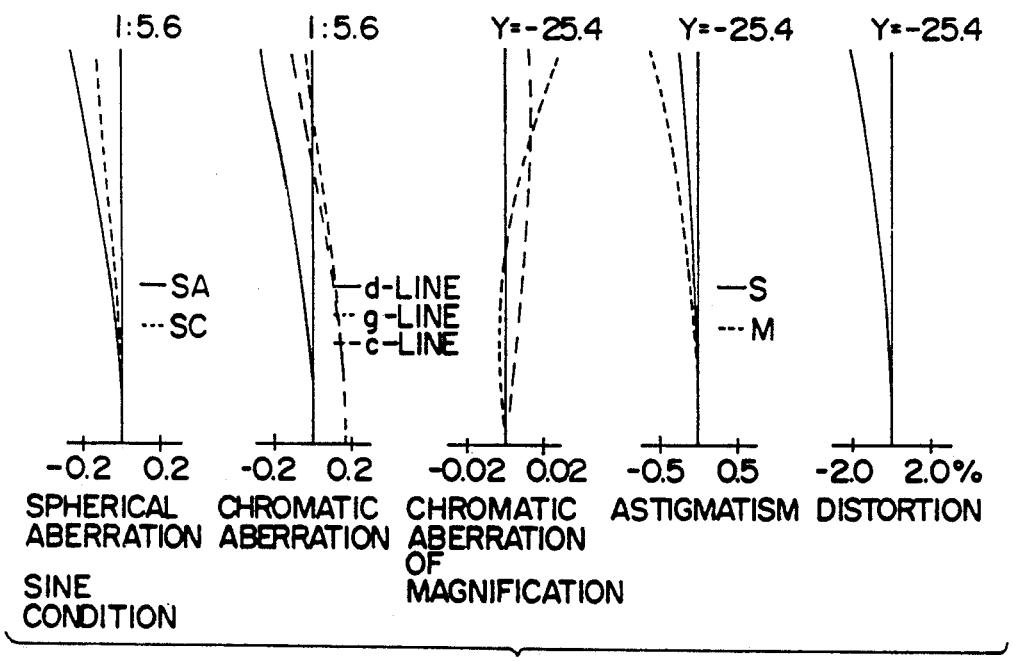
FIG. 6 are various aberration diagrams of the third embodiment.

FIG. 5 shows a magnifying projecting lens of a third embodiment according to the present invention. Concrete numerical constructions are as shown in Table 3. Various aberrations in this construction are shown in FIG. 6.

TABLE 3

FNo. = 1:5.6  f = 60.05  fb = 120.04  m = −0.05X

| Surface number | r | d | n | ν |
|---|---|---|---|---|
| 1 | 57.070 | 3.000 | 1.65844 | 50.9 |
| 2 | 28.897 | 4.794 | | |
| 3 | 136.220 | 3.000 | 1.78590 | 44.2 |
| 4 | 40.195 | 33.545 | | |
| 5 | 221.915 | 4.390 | 1.54814 | 45.8 |
| 6 | −51.531 | 70.475 | | |
| 7 | 114.488 | 3.000 | 1.80518 | 25.4 |
| 8 | 43.558 | 1.820 | | |
| 9 | 47.803 | 9.000 | 1.51633 | 64.1 |
| 10 | −58.640 | | | |

EMBODIMENT 4

Figure 7:
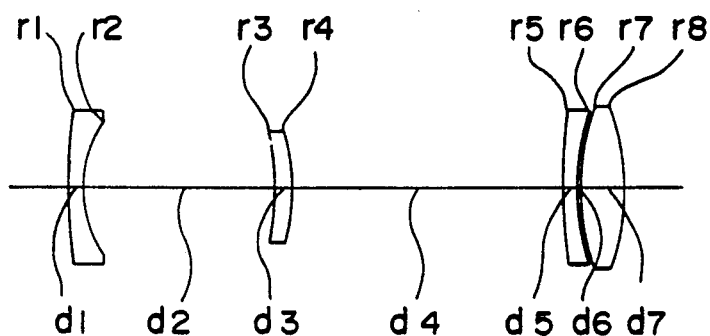
FIG. 7 is a sectional view of a lens of a fourth embodiment.
Figure 8:
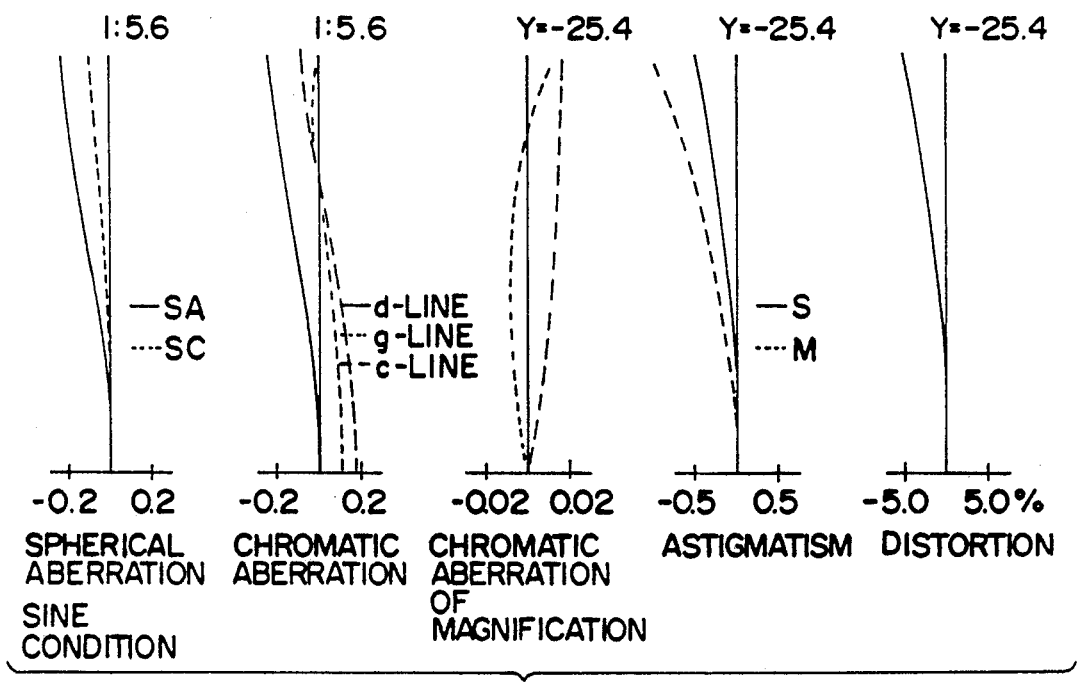
FIG. 8 are various aberration diagrams of the fourth embodiment.

FIG. 7 shows a magnifying projecting lens of a fourth embodiment according to the present invention. Concrete numerical constructions are as shown in Table 4. Various aberrations in this construction are shown in FIG. 8.

TABLE 4

FNo. = 1:5.6  f = 60.06  fb = 120.05  m = −0.05X

| Surface number | r | d | n | ν |
|---|---|---|---|---|
| 1 | 114.377 | 3.000 | 1.65844 | 50.9 |
| 2 | 24.265 | 39.717 | | |
| 3 | −128.309 | 4.220 | 1.57845 | 41.5 |
| 4 | −38.886 | 56.534 | | |
| 5 | 113.633 | 3.000 | 1.80518 | 25.4 |
| 6 | 44.037 | 0.446 | | |
| 7 | 44.227 | 9.000 | 1.51633 | 64.1 |
| 8 | −61.205 | | | |

EMBODIMENT 5

Figure 9:
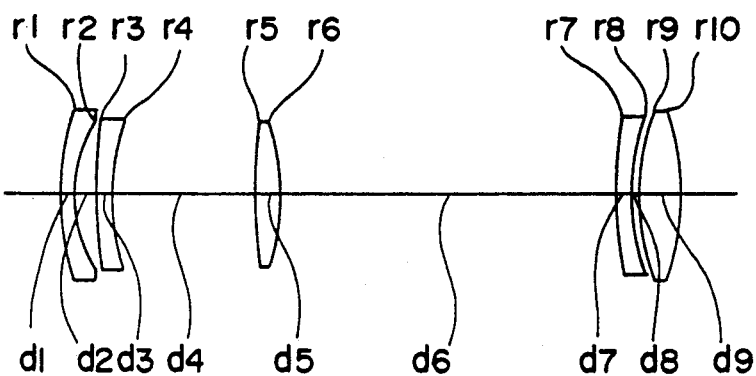
FIG. 9 is a sectional view of a lens of a fifth embodiment.
Figure 10:
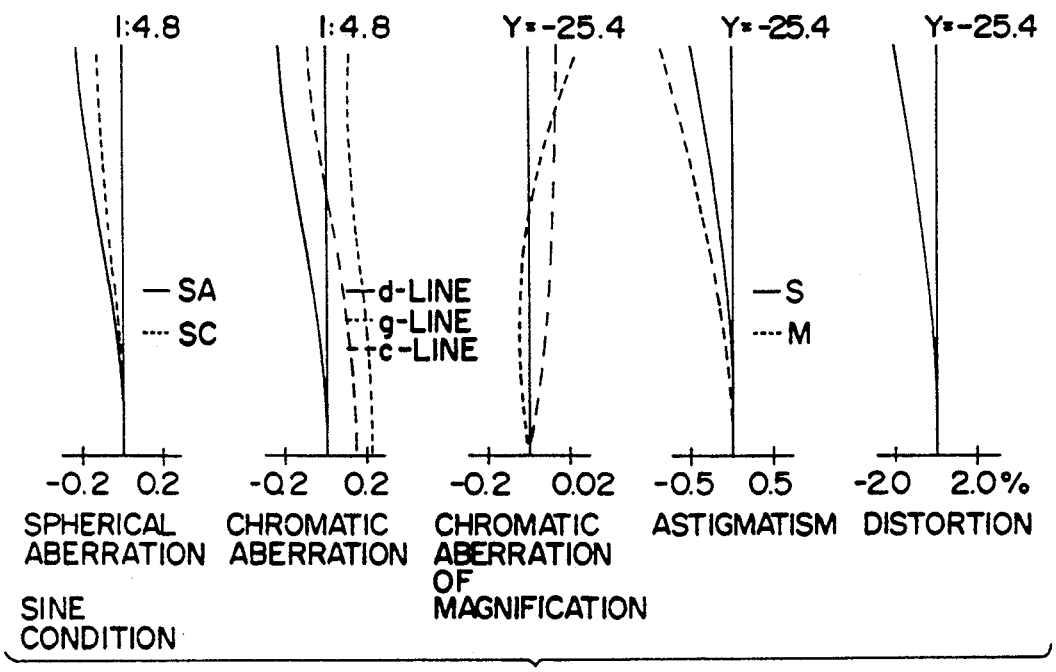
FIG. 10 are various aberration diagrams of the fifth embodiment.

FIG. 9 shows a magnifying projecting lens of a fifth embodiment according to the present invention. Concrete numerical constructions are as shown in Table 5. Various aberrations in this construction are shown in FIG. 10.

TABLE 5

FNo. = 1:4.8  f = 60.05  fb = 120.05  m = −0.05X

| Surface number | r | d | n | ν |
|---|---|---|---|---|
| 1 | 57.763 | 3.000 | 1.77250 | 49.6 |
| 2 | 30.308 | 4.881 | | |
| 3 | 165.517 | 3.000 | 1.78590 | 44.2 |
| 4 | 44.118 | 31.387 | | |
| 5 | 186.752 | 4.835 | 1.54814 | 45.8 |
| 6 | −54.059 | 72.451 | | |
| 7 | 104.759 | 3.000 | 1.80518 | 25.4 |
| 8 | 42.919 | 1.453 | | |
| 9 | 46.267 | 9.000 | 1.51633 | 64.1 |
| 10 | −60.814 | | | |

EMBODIMENT 6

Figure 11:
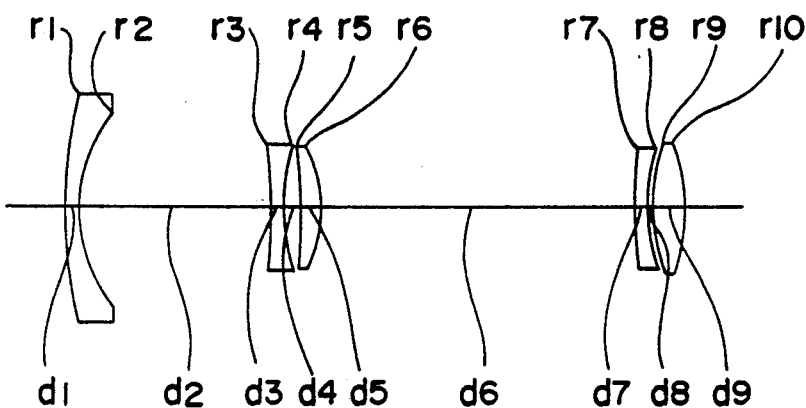
FIG. 11 is a sectional view of a lens of a sixth embodiment.
Figure 12:
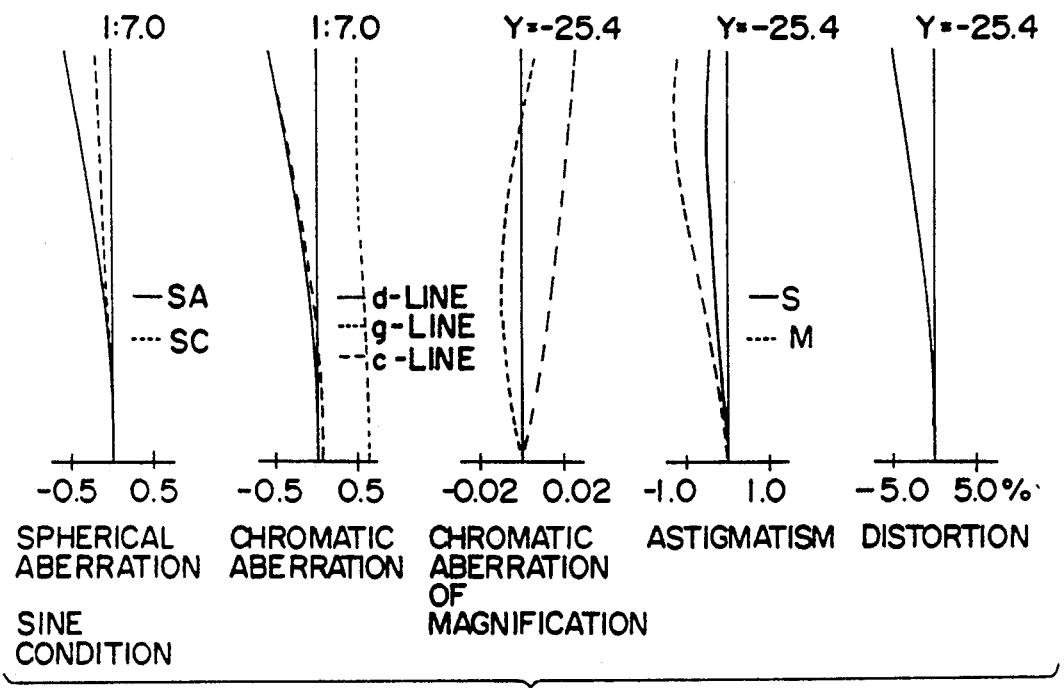
FIG. 12 are various aberration diagrams of the sixth embodiment.

FIG. 11 shows a magnifying projecting lens of a sixth embodiment according to the present invention. Concrete numerical constructions are as shown in Table 6. Various aberrations in this construction are shown in FIG. 12.

TABLE 6

FNo. = 1:7.0  f = 42.03  fb = 119.96  m = −0.05X

| Surface number | r | d | n | ν |
|---|---|---|---|---|
| 1 | 98.398 | 3.000 | 1.77250 | 49.6 |
| 2 | 33.682 | 41.050 | | |
| 3 | −247.020 | 3.000 | 1.78590 | 44.2 |
| 4 | 51.520 | 3.195 | | |
| 5 | −149.460 | 4.273 | 1.67270 | 32.1 |
| 6 | −31.629 | 66.854 | | |
| 7 | 102.000 | 3.000 | 1.80518 | 25.4 |
| 8 | 39.262 | 0.950 | | |
| 9 | 43.426 | 6.805 | 1.51633 | 64.1 |
| 10 | −38.877 | | | |

EMBODIMENT 7

Figure 13:
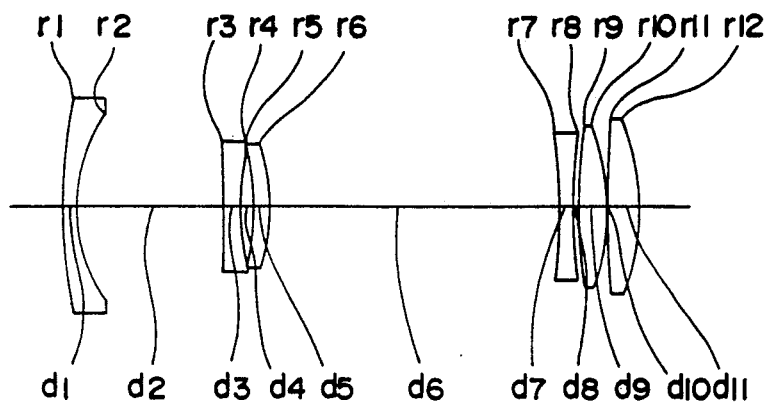
FIG. 13 is a sectional view of a lens of a seventh embodiment.
Figure 14:
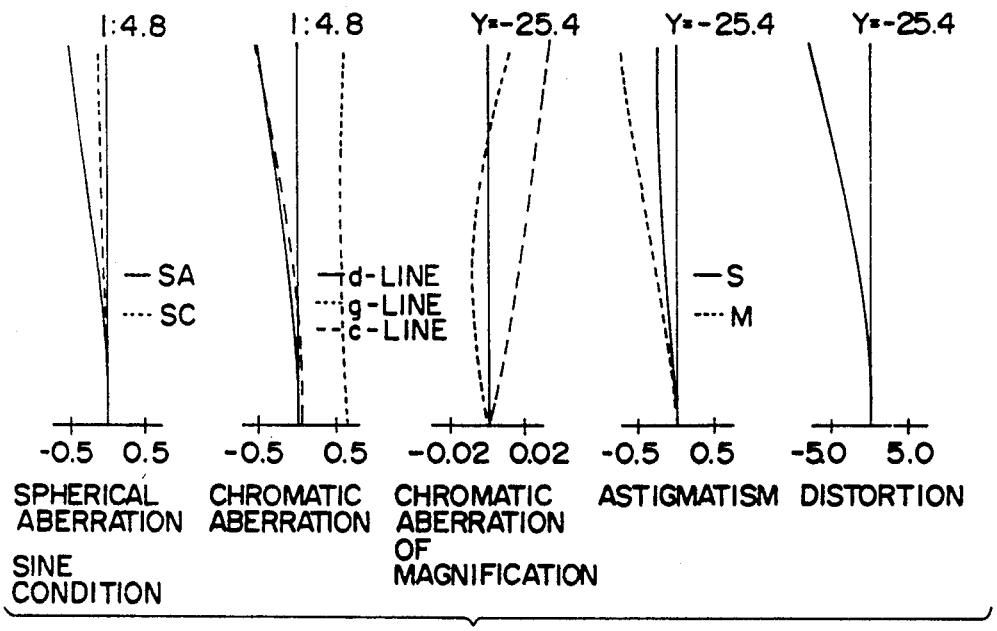
FIG. 14 are various aberration diagrams of the seventh embodiment.

FIG. 13 shows a magnifying projecting lens of a seventh embodiment according to the present invention. Concrete numerical constructions are as shown in Table 7. Various aberrations in this construction are shown in FIG. 14.

TABLE 7

| FNo. = 1:4.8 | f = 42.03 | fb = 119.95 | m = −0.05X | |
|---|---|---|---|---|
| Surface number | r | d | n | ν |
| 1 | 119.336 | 3.000 | 1.77250 | 49.6 |
| 2 | 36.603 | 33.144 | | |
| 3 | −462.615 | 4.000 | 1.78590 | 44.2 |
| 4 | 61.106 | 2.236 | | |
| 5 | −170.162 | 4.882 | 1.75520 | 27.5 |
| 6 | −41.891 | 66.662 | | |
| 7 | −220.967 | 3.000 | 1.80518 | 25.4 |
| 8 | 80.924 | 1.506 | | |
| 9 | 103.522 | 6.484 | 1.51633 | 64.1 |
| 10 | −59.681 | 0.000 | | |
| 11 | 178.571 | 7.205 | 1.51633 | 64.1 |
| 12 | −56.225 | | | |

Next, embodiments 8 to 10, which have a positive condenser lens will be described. The positive condenser lens is disposed near a surface to-be-projected in order that a light beam from the surface to-be-projected can be made incident on a pupil of a projecting lens. Moreover, since the condenser lens is disposed in such a manner as to turn a strong positive curvature surface toward the magnifying side, aberrations can be reduced and the condenser lens can correct the aberrations occurred in the projecting lens.

It is desirable that the condenser lens satisfies condition (4); as follows:

$$0.3 < fc/fb < 1.5 \quad (4)$$

Condition (4) determines the ratio of the focal length fc of the condenser lens and the back focus fb of the projecting lens. Since condition (4) is satisfied, the light beam is made incident on the pupil of the projecting lens.

In addition, the various condenser lenses of the embodiments satisfy condition (5), as follows:

$$0.3 < rc/fc < 1.0 \quad (5)$$

Condition (5) determines the ratio of the radius of curvature rc of the positive surface and the focal length fc of the condenser lens. Since condition (5) is satisfied, the remaining aberrations of the projecting lens, except the condenser lens, can be corrected.

Moreover, it is desirable that at least one surface of the condenser lens is formed as an aspherical surface in order to correct for a distortion with the lens. To easily obtain the aspherical surface, it is desirable that the condenser lens be made from plastic. If the condenser lens is made from plastic, the cost of the lens can be reduced.

EMBODIMENT 8

Figure 15:
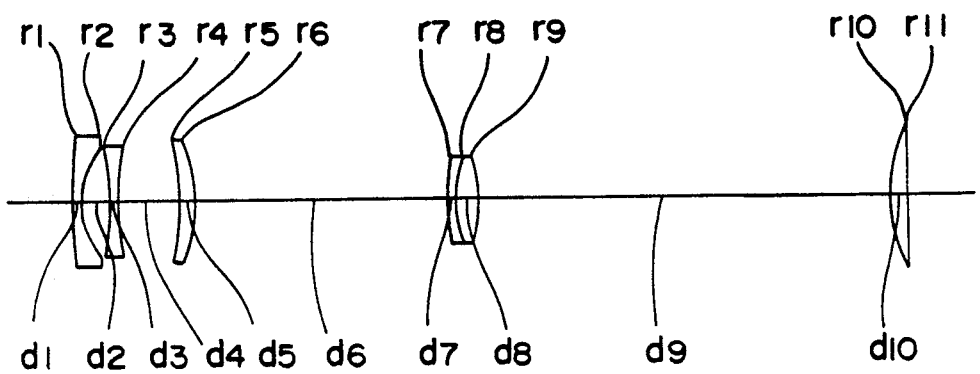
FIG. 15 is a sectional view of a lens of a eighth embodiment.

FIG. 15 shows a magnifying projecting lens of an eighth embodiment according to the present invention. Concrete numerical constructions are as shown in Table 8. In embodiments 8 to 10, reference characters f and fb in the tables indicate a focal length a the back focus except the condenser lens; fh and fbh denote values of whole the system.

In this embodiment, the tenth surface and the eleventh surface indicate that both surfaces of the condenser lens are an aspherical surface.

The aspherical surfaces is expressed as follows:

$$X = \frac{CY^2}{1 + \sqrt{1 - (1 + K)C^2Y^2}} + A4Y^4 + A6Y^6$$

wherein X is a distance from a tangential plane of a vertex of an aspherical surface, Y is the height where from the optical axis, C is a curvature (1/r) of the vertex of the aspherical surface, K is a coefficient of a circular cone, and the A4 and A6 are aspherical surface coefficients. These coefficients are as shown in Table 9.

Figure 16:
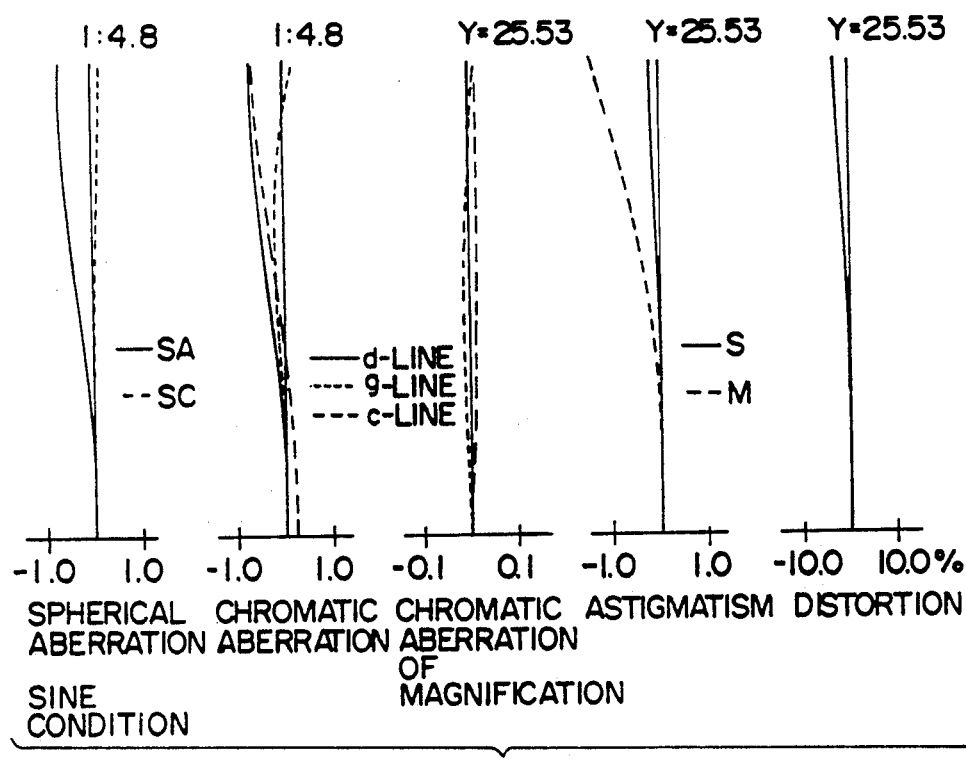
FIG. 16 are various aberration diagrams of the eighth embodiment.

Various aberrations in this construction are shown in FIG. 16.

TABLE 8

| FNo. = 1:4.84 | f = −0.0484 | f = 51.678 | |
|---|---|---|---|
| fb = 169.337 | fh = 45.310 | fbh = 169.506 | |
| Surface number | r | d | n | ν |
| 1 | 239.568 | 3.00 | 1.58913 | 61.2 |
| 2 | 32.164 | 10.70 | | |
| 3 | −102.457 | 3.00 | 1.51633 | 64.1 |
| 4 | 102.457 | 21.80 | | |
| 5 | −131.000 | 6.00 | 1.72825 | 28.5 |
| 6 | −58.000 | 95.46 | | |
| 7 | 88.200 | 2.50 | 1.72825 | 28.5 |
| 8 | 40.400 | 8.00 | 1.51633 | 64.1 |
| 9 | −72.480 | 153.06 | | |
| 10 | 56.972 | 6.60 | 1.49176 | 57.4 |
| 11 | ∞ | | | |

TABLE 9

| | tenth surface |
|---|---|
| K = 0.38930000 | A4 = −0.16370000 × 10⁻⁵ |
| | A6 = 0.76650000 × 10⁻⁹ |
| | eleventh surface |
| K = 0.00000000 | A4 = 0.20000000 × 10⁻⁵ |
| | A6 = 0.00000000 |

EMBODIMENT 9

Figure 17:
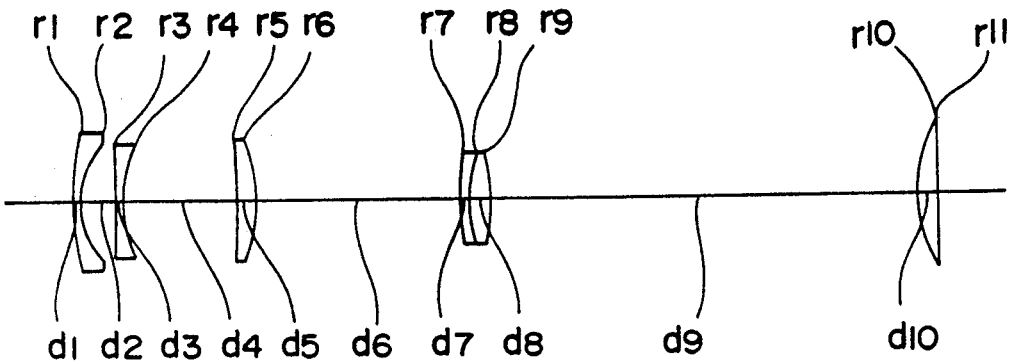
FIG. 17 is a sectional view of a lens of a ninth embodiment.

FIG. 17 shows a magnifying projecting lens of a ninth embodiment according to the present invention. Concrete numerical constructions are as shown in Table 10. In this embodiment, the tenth surface and the eleventh surface, which indicate that both surfaces of the condenser lens are aspherical surfaces, and the condenser lens are made from plastic. The aspherical surface coefficients are as shown in Table 11.

Figure 18:
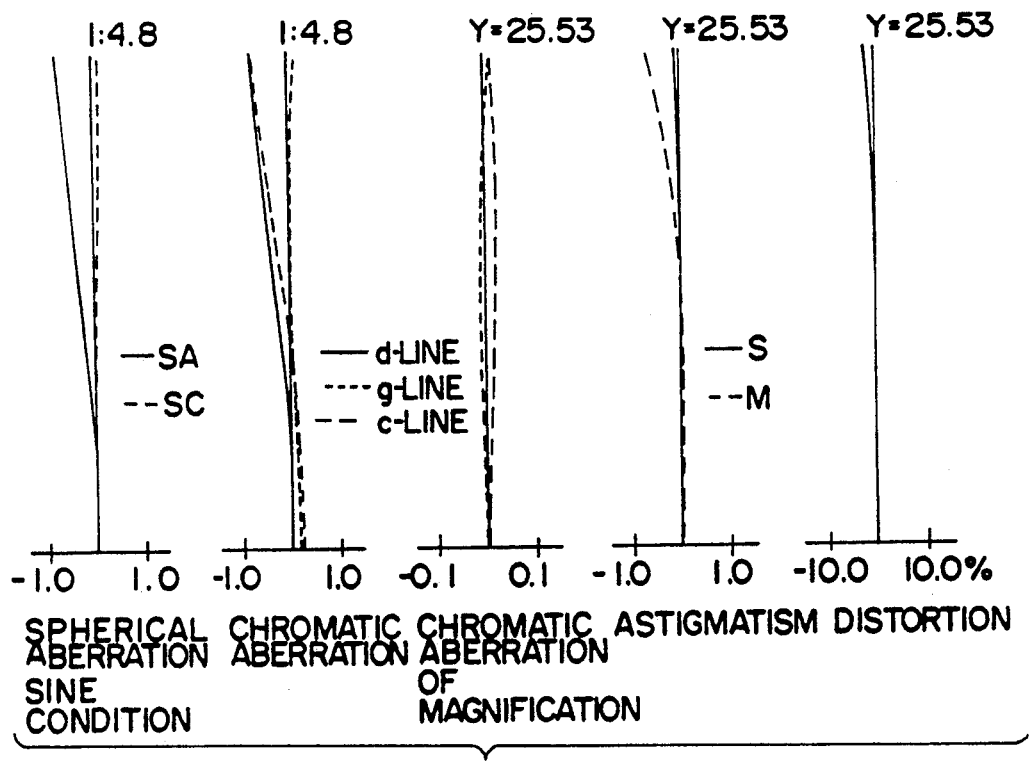
FIG. 18 are various aberration diagrams of the ninth embodiment.

Various aberrations in this construction are shown in FIG. 18.

TABLE 10

| FNo. = 1:4.77 | m = −0.0496 | f = 54.967 | |
|---|---|---|---|
| fb = 168.897 | fh = 48.15 | fbh = 169.051 | |
| Surface number | r | d | n | ν |
| 1 | 107.766 | 3.00 | 1.58913 | 61.2 |
| 2 | 32.103 | 12.09 | | |
| 3 | −667.538 | 3.00 | 1.58913 | 61.2 |
| 4 | 54.394 | 40.88 | | |
| 5 | −205.716 | 6.00 | 1.76182 | 26.6 |
| 6 | −74.954 | 73.93 | | |
| 7 | 137.584 | 2.50 | 1.76182 | 26.6 |
| 8 | 46.040 | 8.00 | 1.58913 | 61.2 |
| 9 | −77.527 | 152.60 | | |
| 10 | 56.608 | 6.60 | 1.49176 | 57.4 |
| 11 | ∞ | | | |

TABLE 11

| tenth surface |
|---|

TABLE 11-continued

| | |
|---|---|
| K = −0.73417600 × 10 | A4 = 0.27922200 × 10⁻⁵ |
| | A6 = −0.22882300 × 10⁻⁹ |
| eleventh surface | |
| K = 0.00000000 | A4 = 0.20000000 × 10⁻⁵ |
| | A6 = 0.00000000 |

EMBODIMENT 10

Figure 19:
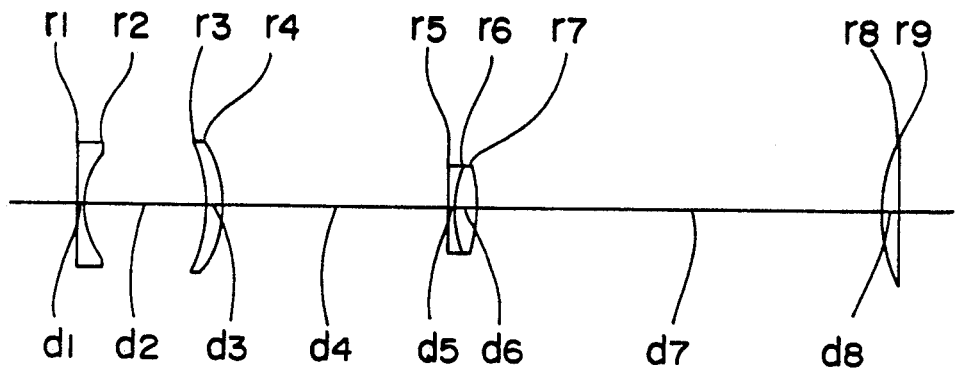
FIG. 19 is a sectional view of a lens of a tenth embodiment.

FIG. 19 shows a magnifying projecting lens of the embodiment 10 according to the present invention. Concrete numerical constructions are as shown in Table 12. In this embodiment, the eighth surface and the ninth surface which indicate that both surfaces of the condenser lens is aspherical surfaces, and the condenser lens is made from plastic. The aspherical surface coefficients are as shown in Table 13.

Figure 20:
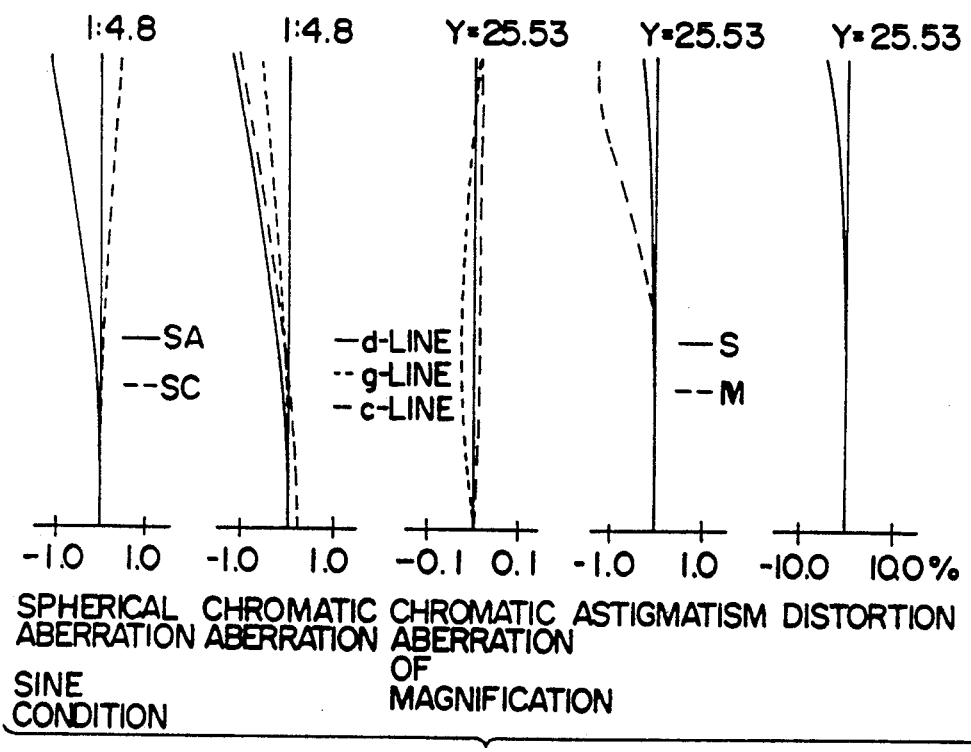
FIG. 20 are various aberration diagrams of the tenth embodiment.

Various aberrations in this construction are shown in FIG. 20.

TABLE 12

FNo. = 1:4.84    m = −0.0496    f = 52.512
fb = 169.609    fh = 45.50    fbh = 169.584

| Surface number | r | d | n | ν |
|---|---|---|---|---|
| 1 | −7224.178 | 3.00 | 1.80400 | 46.6 |
| 2 | 32.012 | 44.86 | | |
| 3 | −63.893 | 6.00 | 1.80518 | 25.4 |
| 4 | −44.010 | 86.18 | | |
| 5 | 150.514 | 2.50 | 1.76182 | 26.6 |
| 6 | 47.562 | 8.00 | 1.60729 | 59.4 |
| 7 | −83.005 | 153.13 | | |
| 8 | 52.576 | 6.60 | 1.49176 | 57.4 |
| 9 | ∞ | | | |

TABLE 13

| | |
|---|---|
| eighth surface | |
| K = −0.90515000 | A4 = 0.29840300 × 10⁻⁵ |
| | A6 = 0.26267700 × 10⁻⁸ |
| ninth surface | |
| K = 0.00000000 | A4 = 0.20000000 × 10⁻⁵ |
| | A6 = 0.00000000 |

Table 14 shows values of conditions (1) to (5) for embodiments 1 to 10.

TABLE 14

| | CONDITIONS | | | | |
|---|---|---|---|---|---|
| EMBODIMENTS | (1) fb/f | (2) L/f | (3) D12/D23 | (4) fc/fb | (5) rc/fc |
| 1 | 2.78 | 2.30 | 0.09 | — | — |
| 2 | 1.95 | 2.22 | 0.45 | — | — |
| 3 | 1.95 | 2.22 | 0.48 | — | — |
| 4 | 1.95 | 1.93 | 0.70 | — | — |
| 5 | 1.95 | 2.21 | 0.43 | — | — |
| 6 | 2.80 | 3.14 | 0.05 | — | — |
| 7 | 2.80 | 3.14 | 0.03 | — | — |
| 8 | 3.28 | 2.91 | 0.23 | 0.685 | 0.491 |
| 9 | 3.07 | 2.72 | 0.55 | 0.682 | 0.492 |
| 10 | 3.23 | 2.87 | 0.52 | 0.630 | 0.492 |

Next, embodiments of variable power magnifying projecting lens embodiment will be described.

The variable power magnifying projecting lenses of embodiments 11 to 21 consist of a negative first lens group, a positive second lens group and a positive third lens group comprising one positive lens and one negative lens arranged in this order from a magnifying side. The focal length is changed by changing a distance between the second lens group and the third lens group and moving the whole system. Such a lens satisfies conditions (6) to (9), as follows:

$$fbw/fw > 1.7 \tag{6}$$

$$Lw/fw > 2.5 \tag{7}$$

$$0.7 < |f12|/fw < (ft/fw) \cdot 1.5 \tag{8}$$

$$D12/D23 < 1.0 \tag{9}$$

wherein, fbw equals a back focus in a wide side of the projecting lens when an object distance is ∞;

fw equals a focal length of the projecting lens in the wide side;

Lw equals a length of the whole system in the wide side;

fw equals a focal length of the whole system in the wide side;

f12 equals a composed focal length of the first lens group and the second lens group;

fw and ft equal focal lengths of the whole system in the wide side and in a tele side;

D12 equals a distance between the first lens group and the second lens group; and D23 equals a distance between the second lens group and the third lens group.

Conditions (6), (7) and (9) are equivalent to conditions (1), (2) and (3). In a variable power lens, as the focal length is variable, the focal length and the back focus are determined in the wide side in which the back focus becomes the smallest.

Condition (8) determines the ratio of the composed focal length f12 of the first and second lens groups in comparison with the focal length fw of the whole system. When condition (8) is satisfied, a fine performance is obtained with a compact arrangement. If |f12|/fw is smaller than 0.7, the power of the first and second lens groups become too large, and a chromatic aberration, spherical aberration and coma aberration become too large. On the contrary, if |f12|/fw is larger than (ft/fw)·1.5, the overall length becomes long and the whole system becomes large.

In this type of variable power lens, since the first and second lens groups move back and forth in such a manner that the loci of the groups have a turning point of motion, moving amounts of the lenses become small. In addition, if the loci are designed symmetrically, the lens becomes compact and a changing amount of the overall length can be reduced.

In lens of the embodiments 11 to 21, the radius of a magnifying side surface of the first lens group is negative. In the variable power lens, it is desirable that the first surface has a negative power in order to obtain a long back focus.

Moreover, in embodiments 11 to 15, and 17 to 21, an F-number Fw in a wide side is lager than an F-number Ft in a tele side.

In general, the F-number of a photographic lens is fixed, even when the power changes in order to maintain a fixed luminance on a film. On the other hand, in the variable power lens of the projector, the luminance on the screen is preferably fixed, even when the power changes.

The luminance on the screen is inversely proportional to the square of the projecting magnification. That is, the luminance in the tele side is higher than the luminance in the wide side because the projecting magnification in the tele side is smaller than the projecting magnification in the wide side.

Therefore, since the F-number Fw in the wide side is lager than than F-number Ft in the tele side, a change of the luminance on the screen by the changing of the power can be reduced.

In order to change the F-number in above-mentioned manner, in the embodiments 11 to 15, an aperture diaphragm moves with the third lens group when the power changes and the luminance on the screen can be fixed.

Furthermore, the aperture diaphragm is disposed in the most magnifying side in the third lens group; an entrance pupil (pupil on a minifying side) of the projecting lens is far from the surface to-be-projected, and ununiforminity of color and luminance by a dichroic mirror can be abated.

EMBODIMENT 11

Figure 21:
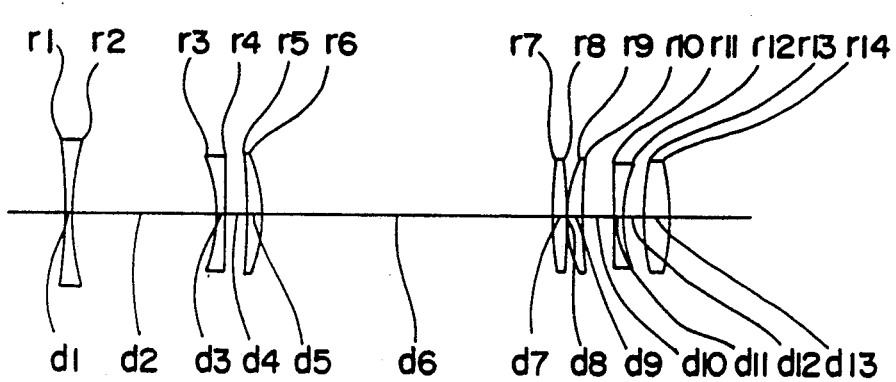
FIG. 21 is a sectional view of a lens in a wide side according to an eleventh embodiment.

FIG. 21 shows a variable power magnifying projecting lens of an eleventh embodiment according to the present invention. Concrete numerical constructions are as shown in Tables 15 and 16. Reference character d0 denotes a distance between the nearest surface to the surface to-be-projected in a third lens group and the aperture diaphragm.

Figure 22:
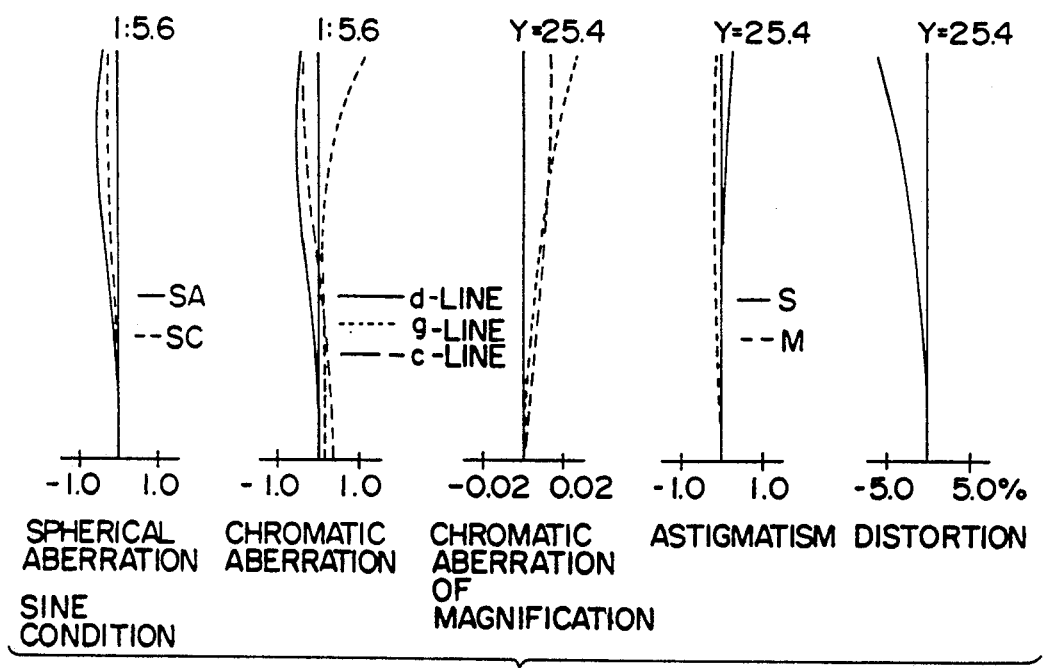
FIG. 22 are various aberration diagrams in the wide side according to the eleventh embodiment.
Figure 23:
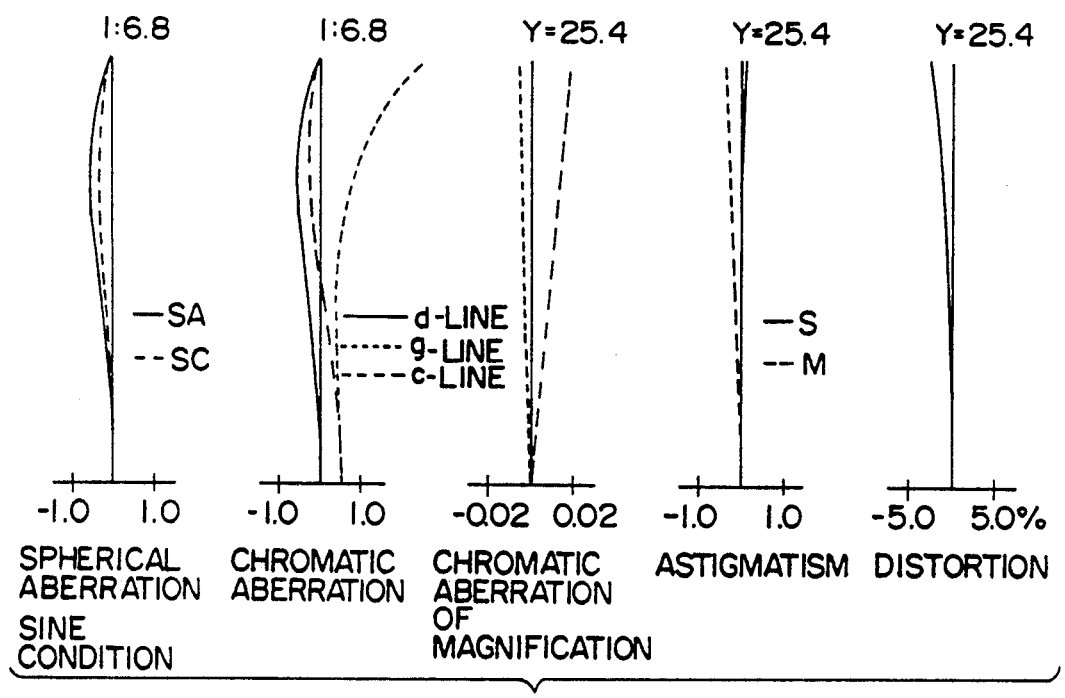
FIG. 23 are various aberration diagrams in a tele side according to an eleventh embodiment.

Various aberrations in this construction in the wide side are shown in FIG. 22, while aberrations in the tele side are shown in FIG. 23.

The distance d6 between the first lens group and the second lens group, and back focus fb change according to the change of the focal length, as shown in Table 16. Distance d6 changes according to a distance U between the projecting lens and the screen, even if the focal length does not change. The values of d6 in the table are under the conditions of U=4.25 m and U=2.25 m.

TABLE 15

| FNo. = 1:5.60~6.82 | f = 80~120 | d0 = 84.153 | |
|---|---|---|---|
| Surface number | r | d | n | ν |
| 1 | −262.771 | 3.000 | 1.65844 | 50.9 |
| 2 | 108.789 | 49.142 | — | |
| 3 | −55.130 | 3.000 | 1.65844 | 50.9 |
| 4 | −818.808 | 7.000 | — | |
| 5 | −800.733 | 5.048 | 1.62004 | 36.3 |
| 6 | −64.785 | variable | — | |
| 7 | 138.327 | 4.636 | 1.51633 | 64.1 |
| 8 | −285.542 | 0.000 | — | |
| 9 | 43.672 | 5.443 | 1.62004 | 36.3 |
| 10 | 142.926 | 11.074 | — | |
| 11 | 5244.396 | 2.500 | 1.80518 | 25.4 |
| 12 | 44.366 | 8.000 | — | |
| 13 | 135.602 | 7.500 | 1.51633 | 64.1 |
| 14 | −109.805 | — | — | |

TABLE 16

| | | f = 80 | f = 100 | f = 120 |
|---|---|---|---|---|
| | (U = ∞) | (99.089) | (66.769) | (45.114) |
| d6 | U = 4.25 m | 102.054 | 69.726 | 48.072 |
| | U = 2.25 m | 105.065 | 72.713 | 51.060 |
| fb | | 170.140 | 192.100 | 214.147 |

EMBODIMENT 12

Figure 24:
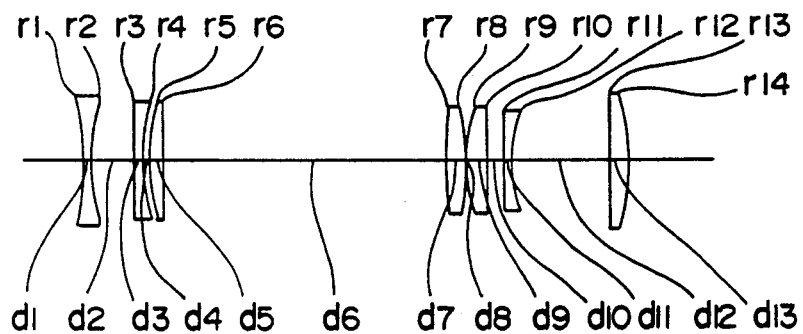
FIG. 24 is a sectional view of a lens in a wide side according to a twelfth embodiment.

FIG. 24 shows a variable power magnifying projecting lens of a twelfth embodiment according to the present invention. Concrete numerical constructions are as shown in Tables 17 and 18.

Figure 25:
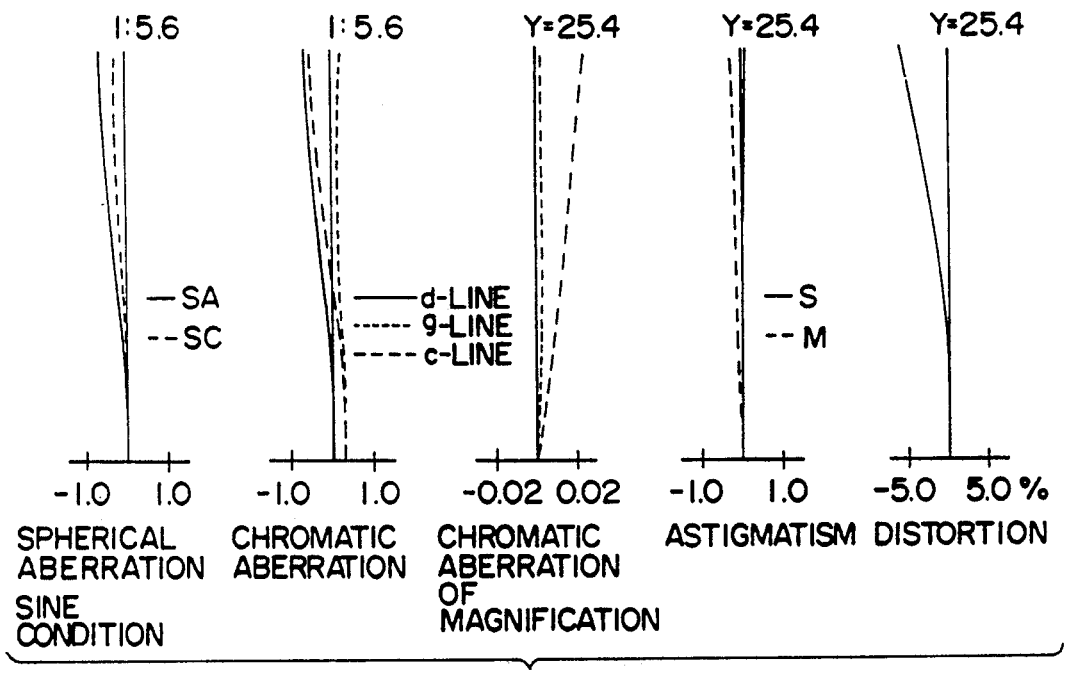
FIG. 25 are various aberration diagrams in the wide side according to the twelfth embodiment.
Figure 26:
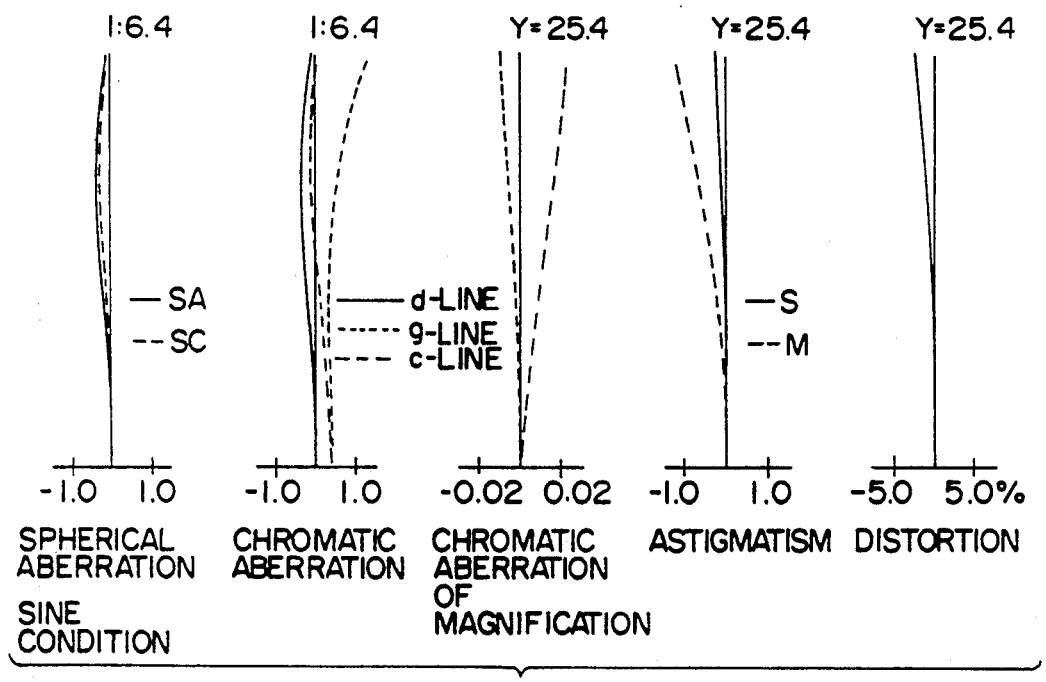
FIG. 26 are various aberration diagrams in a tele side according to the twelfth embodiment.

Various aberrations in this construction in the wide side are shown in FIG. 25, while aberrations in the tele side are shown in FIG. 26.

TABLE 17

| FNo. = 1:5.60~6.38 | f = 80~120 | d0 = 95.483 | |
|---|---|---|---|
| Surface number | r | d | n | ν |
| 1 | −145.917 | 3.000 | 1.51633 | 64.1 |
| 2 | 65.931 | 14.894 | — | |
| 3 | −299.924 | 3.000 | 1.51633 | 64.1 |
| 4 | 82.904 | 2.000 | — | |
| 5 | 79.900 | 4.689 | 1.62004 | 36.3 |
| 6 | −704.410 | variable | — | |
| 7 | 131.719 | 6.454 | 1.51633 | 64.1 |
| 8 | −133.267 | 0.000 | — | |
| 9 | 47.161 | 7.190 | 1.62004 | 36.3 |
| 10 | 389.047 | 6.247 | — | |
| 11 | −410.889 | 2.500 | 1.80518 | 25.4 |
| 12 | 46.799 | 32.831 | — | |
| 13 | 307.056 | 6.600 | 1.51633 | 64.1 |
| 14 | −87.926 | — | — | |

TABLE 18

| | | f = 80 | f = 100 | f = 120 |
|---|---|---|---|---|
| | (U = ∞) | (93.937) | (67.189) | (49.270) |
| d6 | U = 4.25 m | 96.354 | 69.603 | 51.687 |
| | U = 2.25 m | 98.765 | 72.006 | 54.097 |
| fb | | 150.115 | 172.210 | 194.392 |

EMBODIMENT 13

Figure 27:
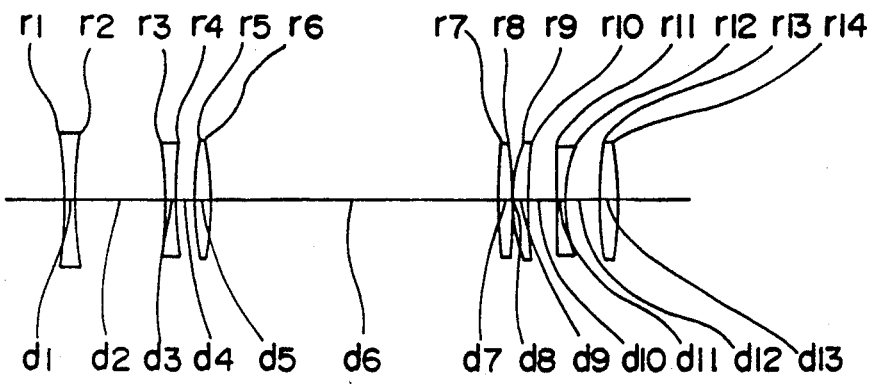
FIG. 27 is a sectional view of a lens in a wide side according to the thirteenth embodiment.

FIG. 27 shows a variable power magnifying projecting lens of a thirteenth embodiment according to the present invention. Concrete numerical constructions are as shown in Tables 19 and 20.

Figure 28:
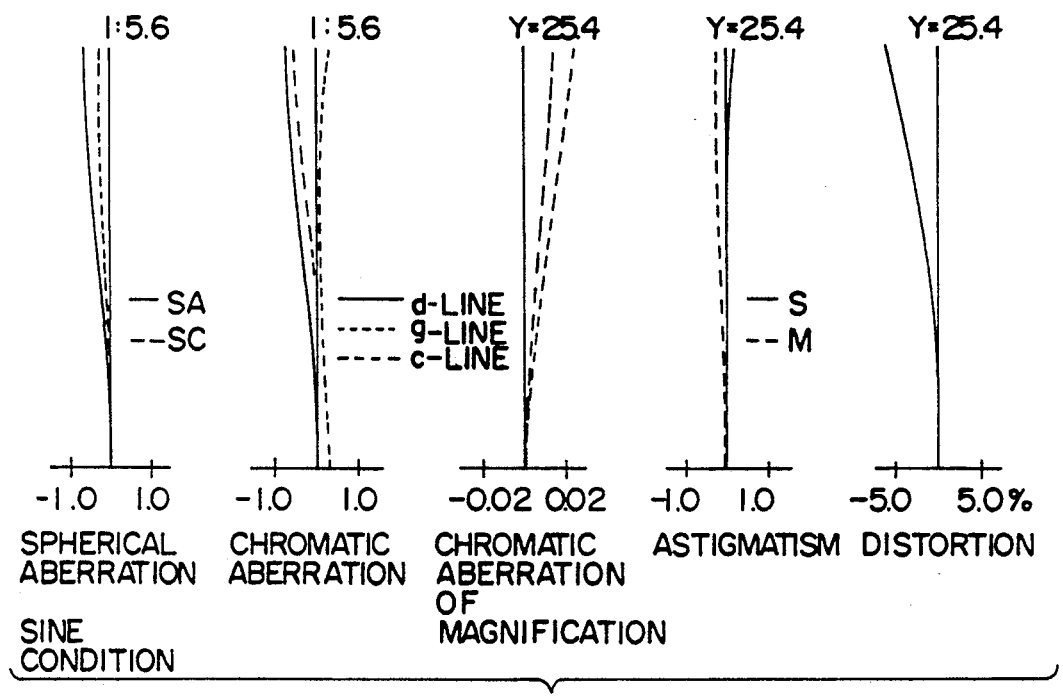
FIG. 28 are various aberration diagrams in the wide side according to the thirteenth embodiment.
Figure 29:
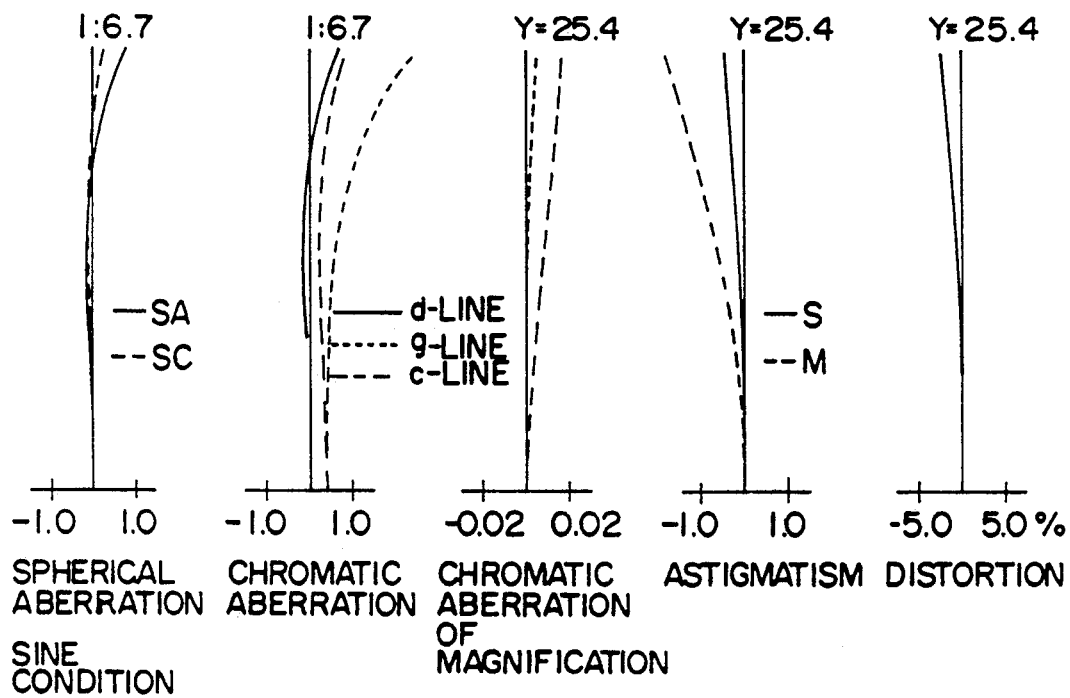
FIG. 29 are various aberration diagrams in a tele side according to the thirteenth embodiment.

Various aberrations in this construction in the wide side are shown in FIG. 28, while aberrations in the tele side are shown in FIG. 29.

TABLE 19

| FNo. = 1:5.60~6.66 | f = 80~120 | d0 = 80.065 | |
|---|---|---|---|
| Surface number | r | d | n | ν |
| 1 | −175.336 | 3.000 | 1.65844 | 50.9 |
| 2 | 106.877 | 30.467 | — | |
| 3 | −113.052 | 3.000 | 1.65844 | 50.9 |
| 4 | 118.765 | 7.000 | — | |
| 5 | 163.406 | 4.899 | 1.64769 | 33.8 |
| 6 | −115.180 | variable | — | |
| 7 | 114.441 | 4.757 | 1.51633 | 64.1 |
| 8 | −304.968 | 0.000 | — | |
| 9 | 45.720 | 5.335 | 1.62004 | 36.3 |
| 10 | 126.738 | 9.623 | — | |
| 11 | 286.061 | 2.500 | 1.80518 | 25.4 |
| 12 | 42.878 | 11.250 | — | |
| 13 | 104.511 | 6.600 | 1.48749 | 70.2 |
| 14 | −140.254 | — | — | |

TABLE 20

| | | f = 80 | f = 100 | f = 120 |
|---|---|---|---|---|
| | (U = ∞) | (95.945) | (68.224) | (49.672) |
| d6 | U = 4.25 m | 98.173 | 70.649 | 52.099 |
| | U = 2.25 m | 100.823 | 73.090 | 54.549 |
| fb | | 170.114 | 193.049 | 216.054 |

EMBODIMENT 14

Figure 30:
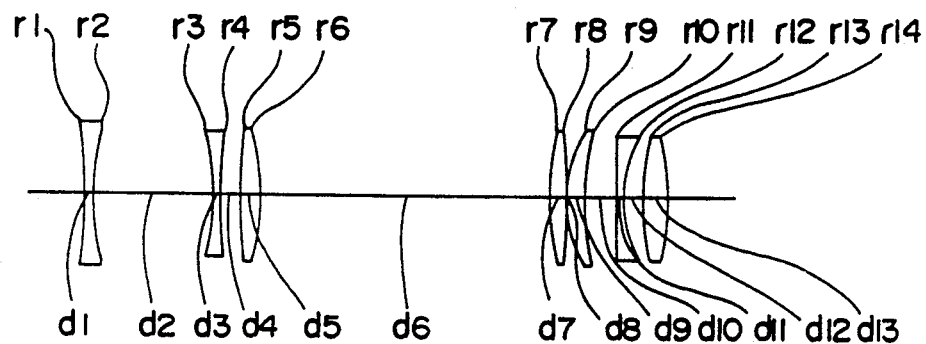
FIG. 30 is a sectional view of a lens in a wide side according to a fourteenth embodiment.

FIG. 30 shows a variable power magnifying projecting lens of a fourteenth embodiment according to the present invention. Concrete numerical constructions are as shown in Tables 21 and 22.

Figure 31:
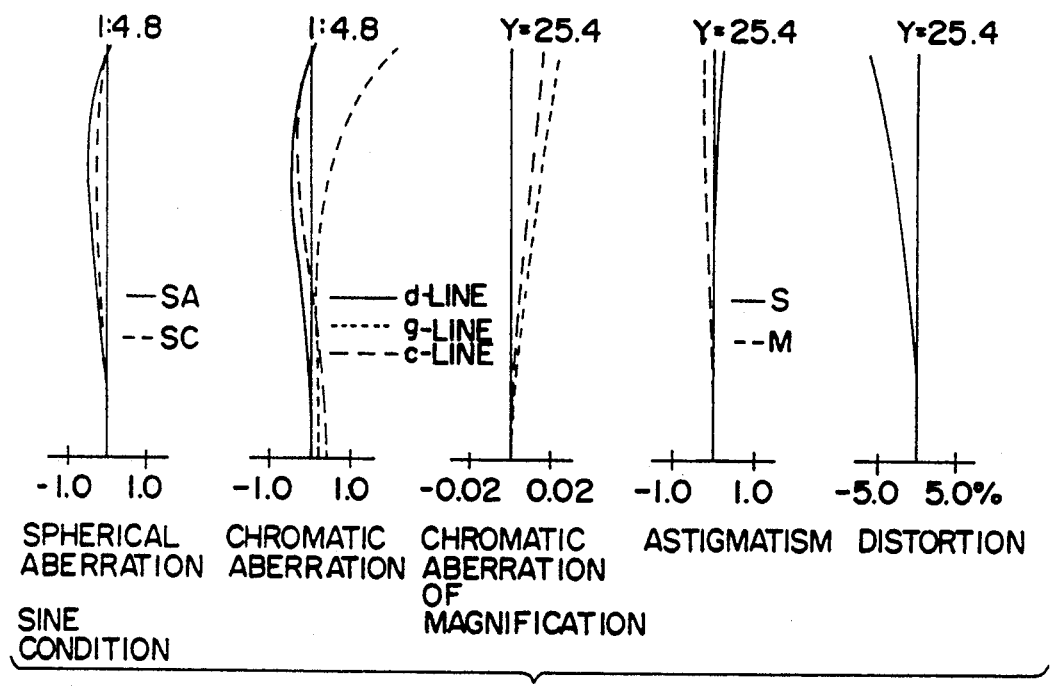
FIG. 31 are various aberration diagrams in the wide side according to the fourteenth embodiment.
Figure 32:
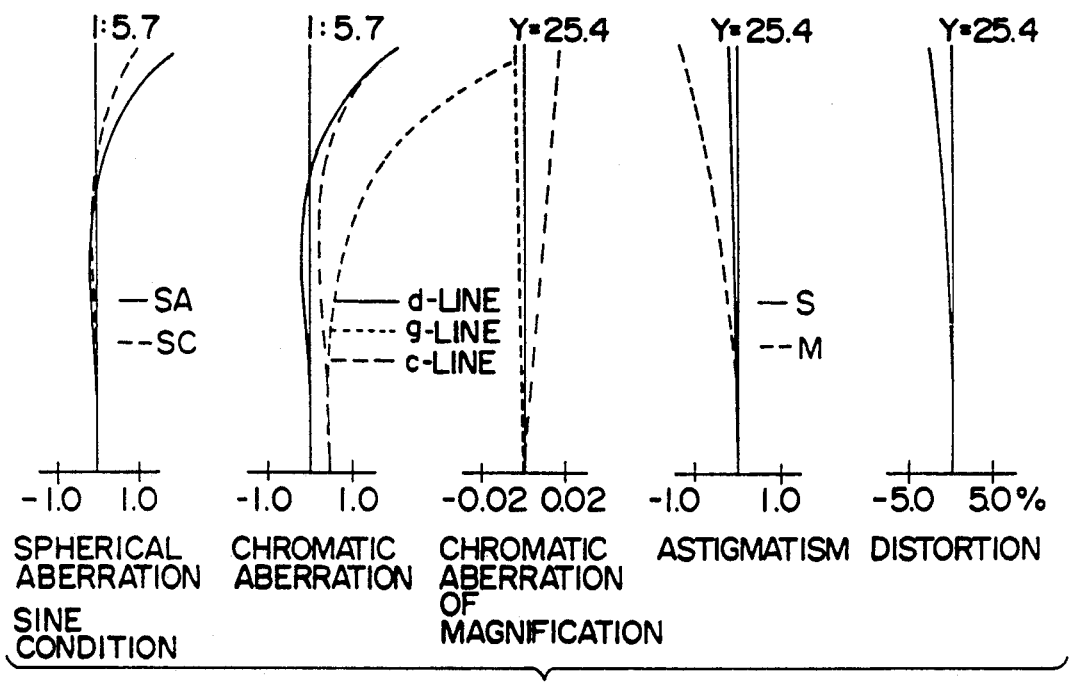
FIG. 32 are various aberration diagrams in a tele side according to the embodiment 14.

Various aberrations in this construction in the wide side are shown in FIG. 31, while aberrations in the tele side are shown in FIG. 32.

TABLE 21

FNo. = 1:4.80~5.74  f = 80~120  d0 = 83.679

| Surface number | r | d | n | v |
|---|---|---|---|---|
| 1 | −153.176 | 3.000 | 1.65844 | 50.9 |
| 2 | 108.867 | 40.377 | — | |
| 3 | −108.040 | 3.000 | 1.65844 | 50.9 |
| 4 | 179.469 | 7.000 | — | |
| 5 | 228.919 | 6.055 | 1.62004 | 36.3 |
| 6 | −97.250 | variable | — | |
| 7 | 148.271 | 5.008 | 1.51633 | 64.1 |
| 8 | −286.878 | 0.000 | — | |
| 9 | 44.187 | 6.894 | 1.62004 | 36.3 |
| 10 | 135.242 | 9.777 | — | |
| 11 | 783.469 | 2.500 | 1.80518 | 25.4 |
| 12 | 43.924 | 7.000 | — | |
| 13 | 115.429 | 7.500 | 1.51633 | 64.1 |
| 14 | −121.948 | — | — | |

TABLE 22

| | | f = 80 | f = 100 | f = 120 |
|---|---|---|---|---|
| | (U = ∞) | (99.244) | (66.849) | (45.137) |
| d6 | U = 4.25 m | 102.251 | 69.848 | 48.136 |
| | U = 2.25 m | 105.299 | 72.872 | 51.160 |
| fb | | 170.170 | 191.858 | 213.639 |

EMBODIMENT 15

Figure 33:
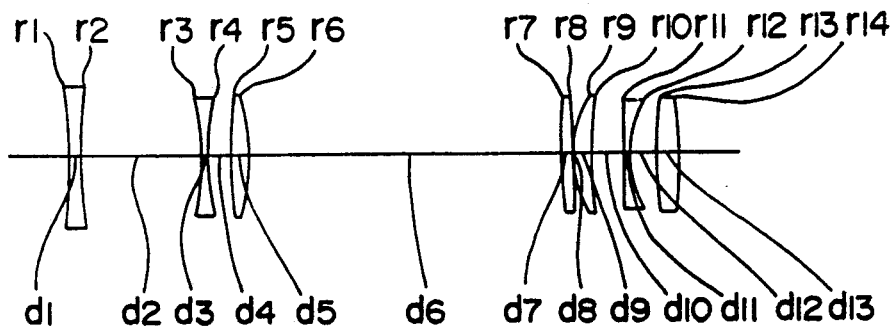
FIG. 33 is a sectional view of the lens in wide side according to the embodiment 15.

FIG. 33 shows a variable power magnifying projecting lens of a fifteenth embodiment according to the present invention. Concrete numerical constructions are as shown in Tables 23 and 24.

Figure 34:
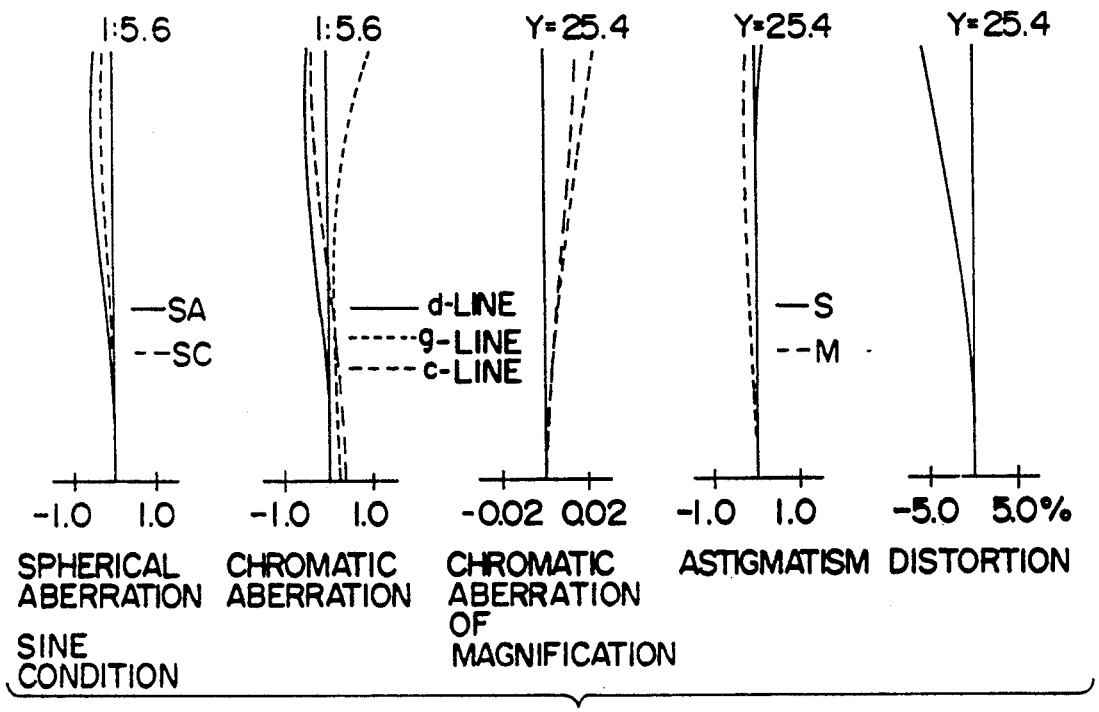
FIG. 34 are various aberration diagrams in the wide side according to the fifteenth embodiment.
Figure 35:
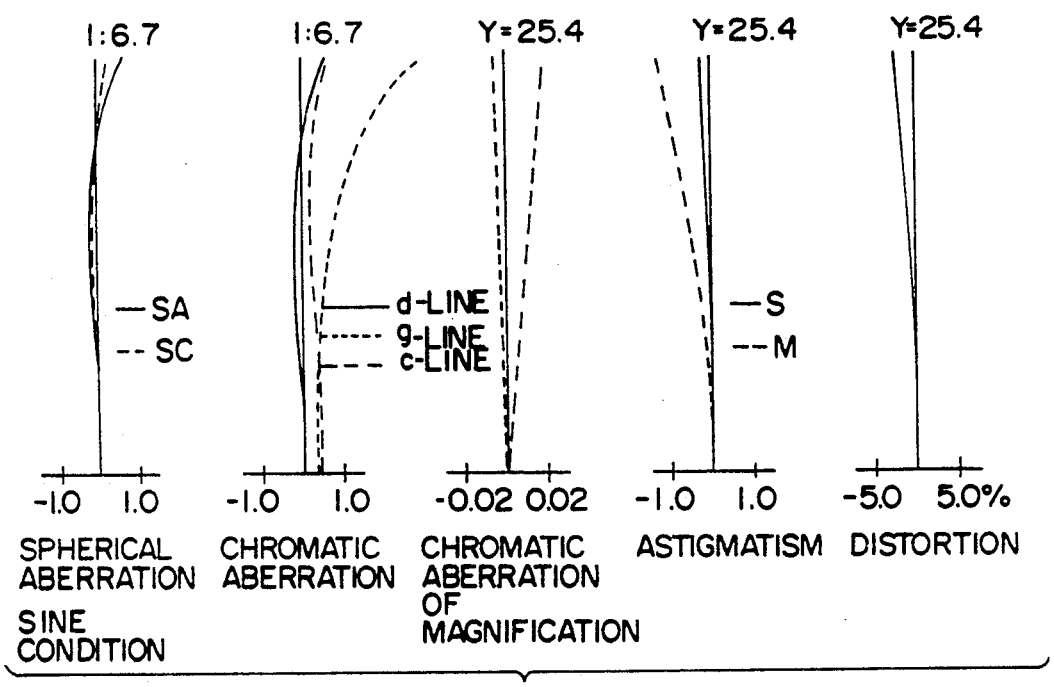
FIG. 35 are various aberration diagrams in a tele side according to the fifteenth embodiment.

Various aberrations in this construction in the wide side are shown in FIG. 34, while aberrations in the tele side are shown in FIG. 35.

TABLE 23

FNo. = 1:5.60~6.74  f = 80~120  d0 = 84.994

| Surface number | r | d | n | v |
|---|---|---|---|---|
| 1 | −158.854 | 3.000 | 1.65844 | 50.9 |
| 2 | 111.640 | 39.090 | — | |
| 3 | −100.780 | 3.000 | 1.65844 | 50.9 |
| 4 | 165.851 | 7.000 | — | |
| 5 | 217.936 | 5.113 | 1.62004 | 36.3 |
| 6 | −93.455 | variable | — | |
| 7 | 141.490 | 4.600 | 1.51633 | 64.1 |
| 8 | −273.475 | 0.000 | — | |
| 9 | 43.095 | 5.431 | 1.62004 | 36.3 |
| 10 | 131.474 | 10.073 | — | |
| 11 | 592.878 | 2.500 | 1.80518 | 25.4 |
| 12 | 42.934 | 8.000 | — | |
| 13 | 120.860 | 7.500 | 1.51633 | 64.1 |
| 14 | −124.655 | — | — | |

TABLE 24

| | | f = 80 | f = 100 | f = 120 |
|---|---|---|---|---|
| | (U = ∞) | (100.152) | (68.324) | (47.006) |
| d6 | U = 4.25 m | 103.089 | 71.253 | 49.936 |
| | U = 2.25 m | 106.064 | 74.205 | 52.889 |
| fb | | 170.135 | 191.934 | 213.815 |

EMBODIMENT 16

Figure 36:
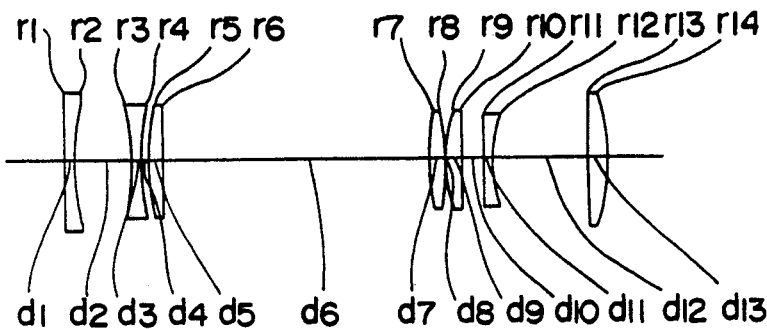
FIG. 36 is a sectional view of a lens in a wide side according to a sixteenth embodiment.

FIG. 36 shows a variable power magnifying projecting lens of a sixteenth embodiment according to the present invention. Concrete numerical constructions are as shown in Tables 25 and 26.

Figure 37:
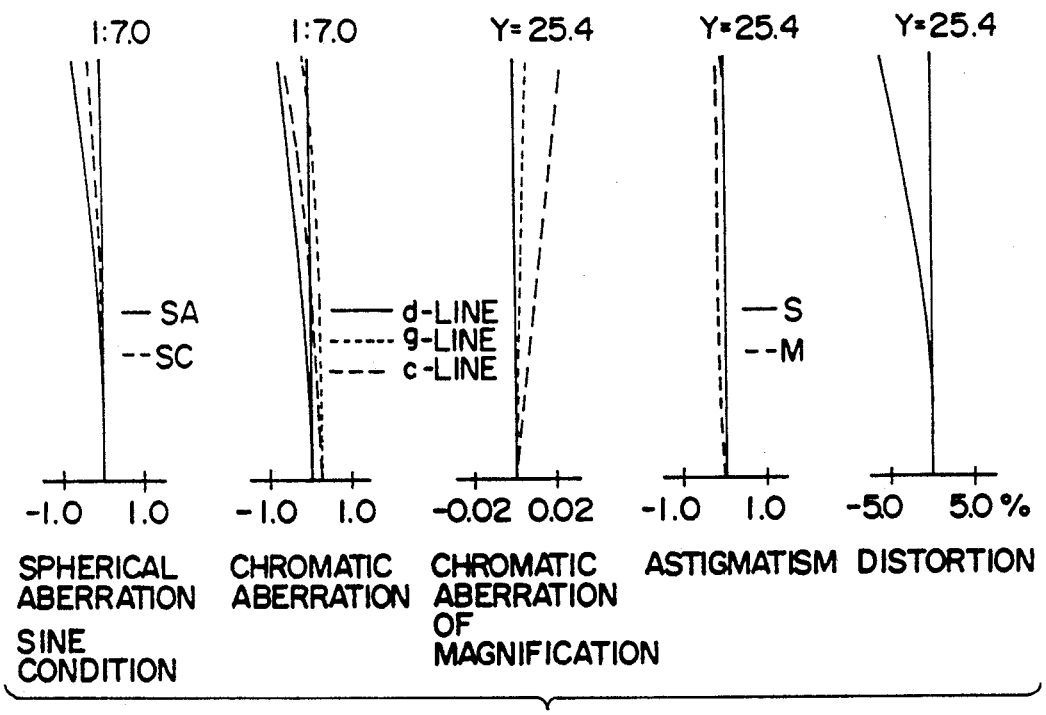
FIG. 37 are various aberration diagrams in the wide side according to the sixteenth embodiment.
Figure 38:
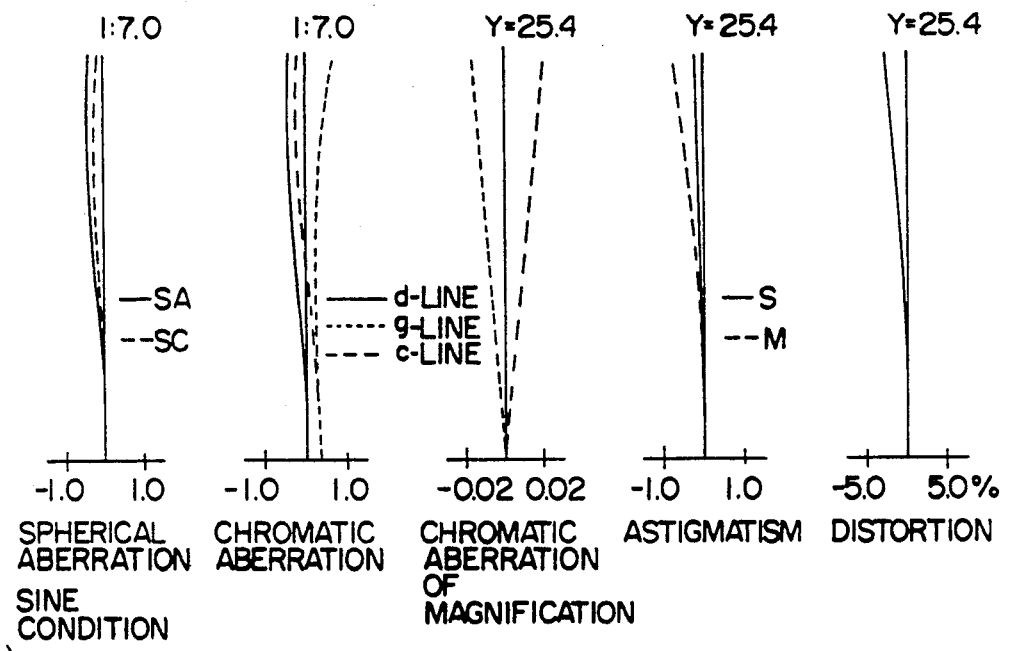
FIG. 38 are various aberration diagrams in a tele side according to the sixteenth embodiment.

Various aberrations in this construction in the wide side are shown in FIG. 37, while aberrations in the tele side are shown in FIG. 38.

In this embodiment, the motion of the aperture diaphragm is independent of the third lens group.

TABLE 25

FNo. = 1:7.00  f = 80~120

| Surface number | r | d | n | v |
|---|---|---|---|---|
| 1 | −769.547 | 3.000 | 1.51633 | 64.1 |
| 2 | 94.593 | 19.315 | — | |
| 3 | −102.692 | 3.000 | 1.51633 | 64.1 |
| 4 | 57.844 | 2.726 | — | |
| 5 | 68.520 | 6.000 | 1.62004 | 36.3 |
| 6 | −849.863 | variable | — | |
| 7 | 132.636 | 5.000 | 1.51633 | 64.1 |
| 8 | −126.784 | 0.000 | — | |
| 9 | 48.194 | 4.984 | 1.62004 | 36.3 |
| 10 | 294.138 | 8.112 | — | |
| 11 | −348.511 | 2.500 | 1.80518 | 25.4 |
| 12 | 47.498 | 31.731 | — | |
| 13 | 268.987 | 6.600 | 1.51633 | 64.1 |
| 14 | −76.324 | — | — | |

TABLE 26

| | | f = 80 | f = 100 | f = 120 |
|---|---|---|---|---|
| | (U = ∞) | (87.348) | (61.250) | (43.788) |
| d6 | U = 4.25 m | 89.749 | 63.648 | 46.189 |
| | U = 2.25 m | 92.130 | 66.021 | 48.569 |
| fb | | 150.080 | 171.721 | 193.424 |
| d0 | | 79.393 | 72.531 | 63.927 |

In the embodiments 17 to 21, front lens group consists of one negative lens and one positive lens, when the whole system is divided into the front and rear lens groups between which the distance is variable.

This construction makes the number of lens pieces small, and maintains the long back focus and lowers the cost of manufacture.

In addition, the lenses of embodiments satisfy the condition (10), as follows:

$$d0/fw > 0.2 \tag{10}$$

wherein, d0 equals a distance between the aperture diaphragm and the last surface of the rear lens group;

fw equals a focal length of the lens in a wide side

Condition (10) is provided for purposes of jutting the aperture diaphragm in a front side of the rear lens group (i.e., the screen side) to arrange the pupil of the surface to-be-projected to a side near the screen; an incident angle of the light beam passing through a peripheral portion of the surface to-be-projected to the pupil then becomes small. The condition is provided for making a change of movement of the pupil by the changing of power small.

If condition (10) is not satisfied, the light intensity becomes non-uniform, due to a transmittance difference of an incident angle into a liquid crystal display as the surface to-be-projected. Accordingly, color shedding occurs, due to an angular characteristic of the dichroic mirror.

The rear lens groups of embodiments 19 and 21 comprised one negative lens and one positive lens, such that the lenses can be produced at lower cost.

The lenses of embodiments 20 and 21 have a condenser lens that is disposed on a most minifying side of the projecting lens. The condenser lens is equivalent to the condenser lens described in embodiment 8.

EMBODIMENT 17

Figure 39:
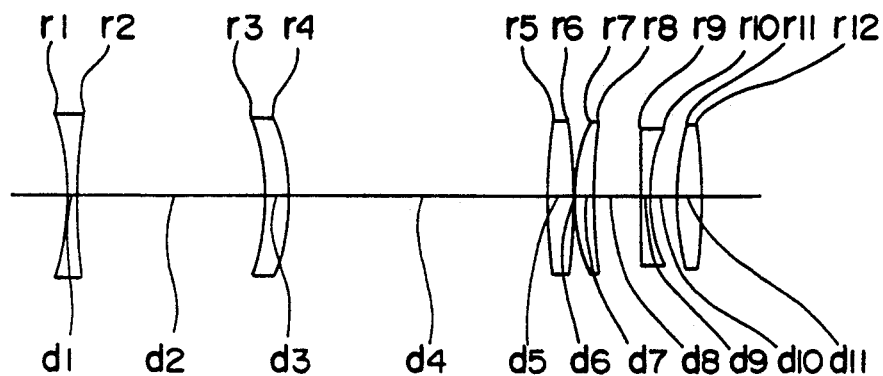
FIG. 39 is a sectional view of a lens in a wide side according to a seventeenth embodiment.

FIG. 39 shows a variable power magnifying projecting lens of a seventeenth embodiment according to the present invention. Concrete numerical constructions are as shown in Table 27.

Figure 40:
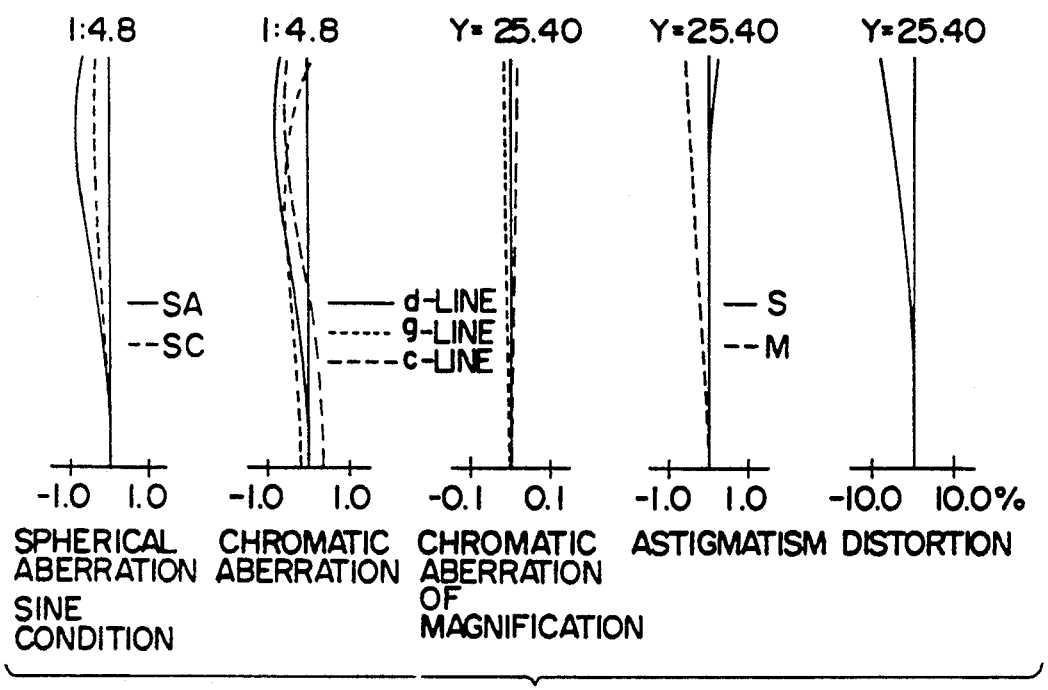
FIG. 40 are various aberration diagrams in the wide side according to the seventeenth embodiment.
Figure 41:
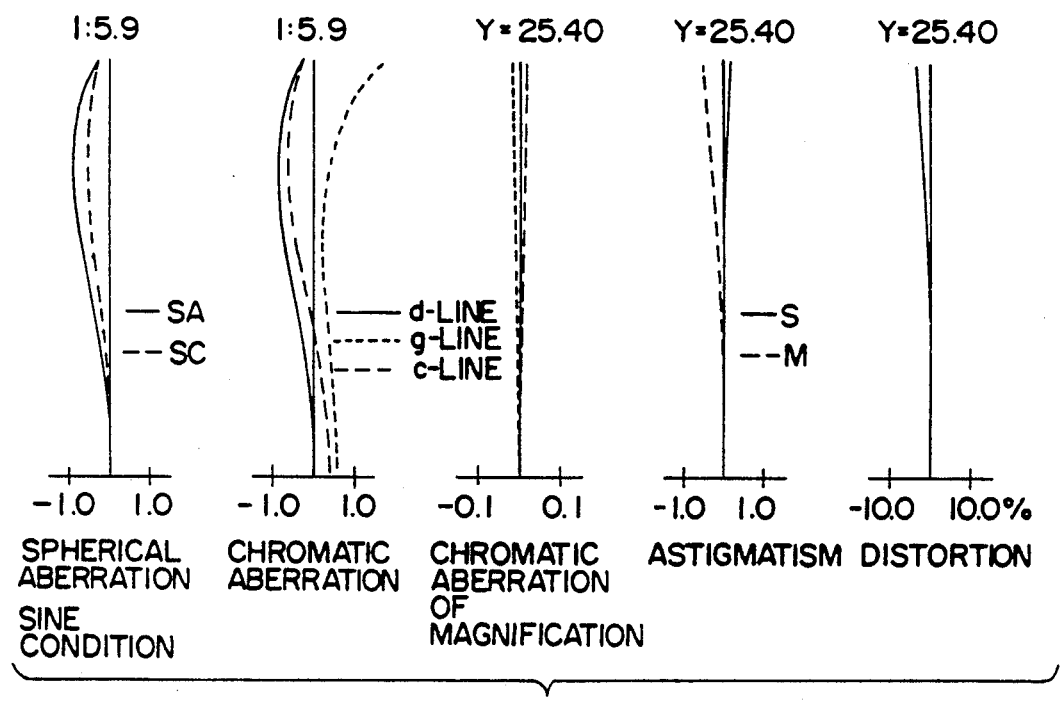
FIG. 41 are various aberration diagrams in a tele side according to the seventeenth embodiment.

Various aberrations in this construction in the wide side (m=−0.017× at the minifying side, m=60× in the magnifying side) are shown in FIG. 40, while aberrations in the tele side (m=−0.067× at the minifying side, m=15× in the magnifying side) are shown at FIG. 41.

At this embodiment, the motion of the aperture diaphragm is independent of the third lens group.

Distance d4 between the second lens and the third lens changes according to a change of the focal length as shown in Table 28.

Distance d4 changes according to the magnification m; the values of d4 in the table are under the conditions of m=−0.017× and m=−0.067×.

TABLE 27

FNo. = 1:4.8∼5.9  f = 80.00∼120.00
m = −0.017∼−0.067  fb = 163.00∼208.16

| Surface number | r | d | n | ν |
|---|---|---|---|---|
| 1 | −86.323 | 3.00 | 1.67000 | 57.3 |
| 2 | 134.482 | 55.00 | | |
| 3 | −62.394 | 6.83 | 1.74077 | 27.8 |
| 4 | −58.887 | variable | | |
| 5 | 123.460 | 7.01 | 1.48749 | 70.2 |
| 6 | −273.751 | 0.88 | | |
| 7 | 47.604 | 5.78 | 1.64769 | 33.8 |
| 8 | 134.384 | 13.18 | | |
| 9 | 472.302 | 2.50 | 1.80518 | 25.4 |
| 10 | 42.972 | 8.00 | | |
| 11 | 74.664 | 6.60 | 1.48749 | 70.2 |
| 12 | −190.947 | | | |

TABLE 28

| | f = 80.00 | f = 120.00 |
|---|---|---|
| (object distance ∞) | (d4 = 73.40) | (d4 = 25.97) |
| m = −0.017 × | d4 = 75.50 | — |
| m = −0.067 × | — | d4 = 31.56 |

EMBODIMENT 18

Figure 42:
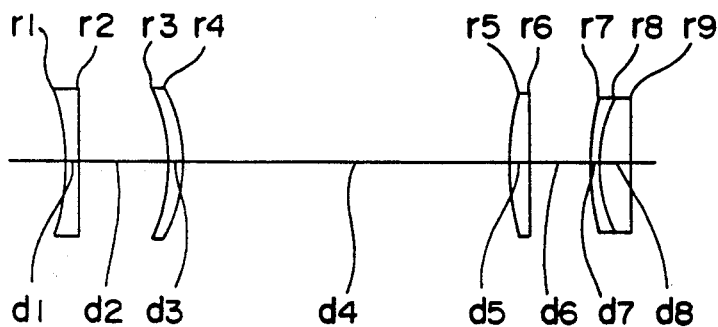
FIG. 42 is a sectional view of a lens in a wide side according to the eighteenth embodiment.

FIG. 42 shows a variable power magnifying projecting lens of an eighteenth embodiment according to the present invention. Concrete numerical constructions are as shown in Tables 29 and 30.

Figure 43:
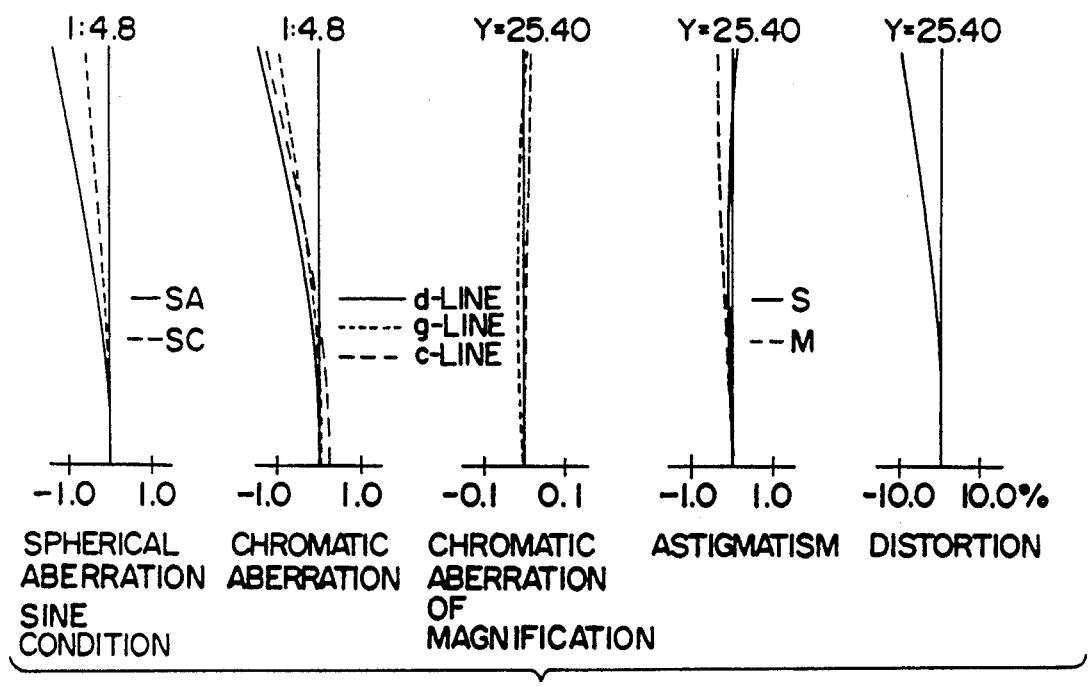
FIG. 43 are various aberration diagrams in the wide side according to the eighteenth embodiment.
Figure 44:
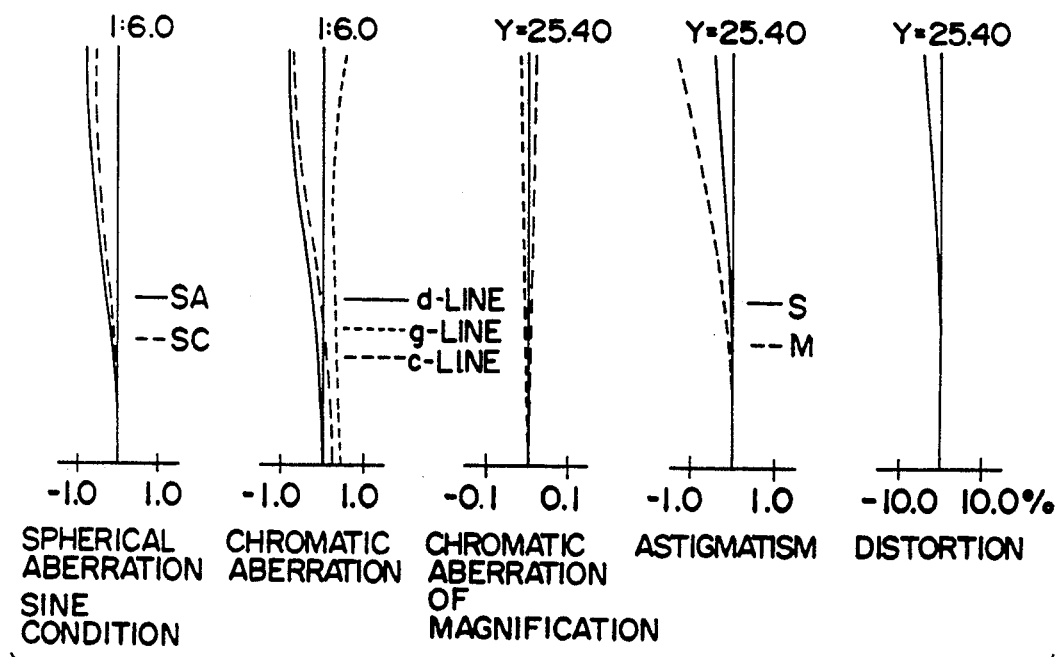
FIG. 44 are various aberration diagrams in a tele side according to the eighteenth embodiment.

Various aberrations in this construction in the wide side are shown in FIG. 43, while aberrations in the tele side are shown in FIG. 44.

TABLE 29

FNo. = 1:4.8∼6.0  f = 80.00∼120.00
m = −0.017∼−0.067  fb = 170.00∼212.47

| Surface number | r | d | n | ν |
|---|---|---|---|---|
| 1 | −57.412 | 3.00 | 1.74320 | 49.3 |
| 2 | 363.187 | 24.97 | | |
| 3 | −56.778 | 4.07 | 1.78472 | 25.7 |
| 4 | −47.163 | variable | | |
| 5 | 85.274 | 5.00 | 1.60342 | 38.0 |
| 6 | 2174.229 | 17.38 | | |
| 7 | 80.756 | 2.50 | 1.80518 | 25.4 |
| 8 | 40.935 | 9.00 | 1.48749 | 70.2 |

TABLE 29-continued

FNo. = 1:4.8∼6.0  f = 80.00∼120.00
m = −0.017∼−0.067  fb = 170.00∼212.47

| Surface number | r | d | n | ν |
|---|---|---|---|---|
| 9 | −1077.823 | | | |

TABLE 30

| | f = 80.00 | f = 120.00 |
|---|---|---|
| (m = ∞) | (d4 = 90.81) | (d4 = 44.686) |
| m = −0.017 × | d4 = 92.97 | — |
| m = −0.067 × | — | d4 = 50.47 |

EMBODIMENT 19

Figure 45:
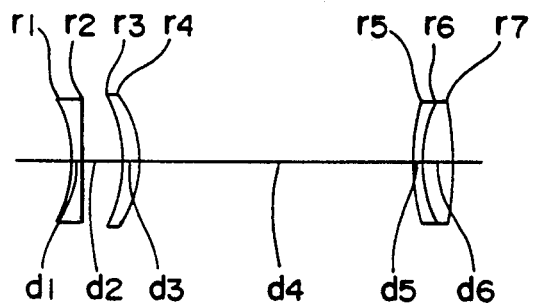
FIG. 45 is a sectional view of a lens in a wide side according to a nineteenth embodiment.

FIG. 45 shows a variable power magnifying projecting lens of a nineteenth embodiment according to the present invention. Concrete numerical constructions are as shown in Tables 31 and 32.

Figure 46:
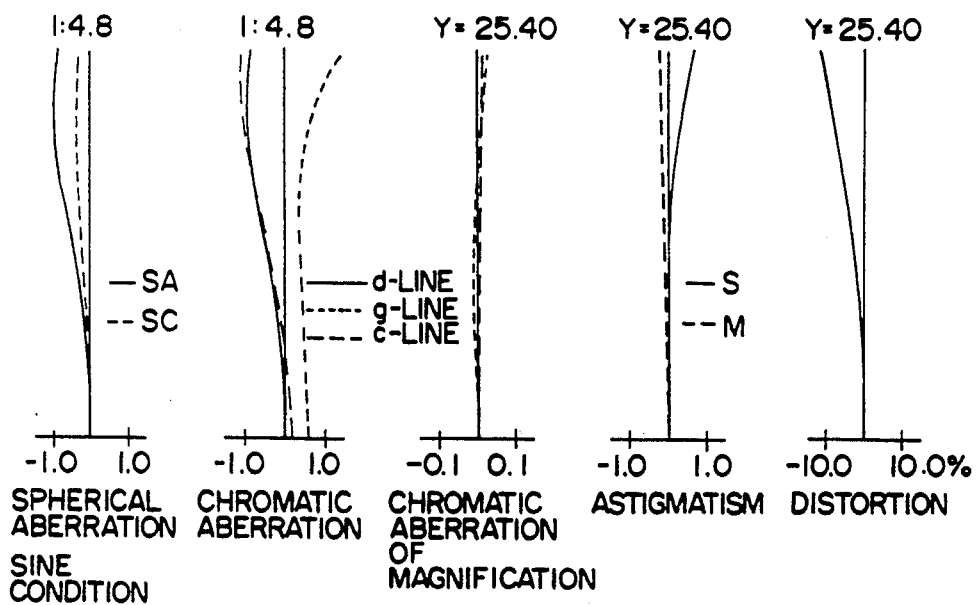
FIG. 46 are various aberration diagrams in the wide side according to the nineteenth embodiment.
Figure 47:
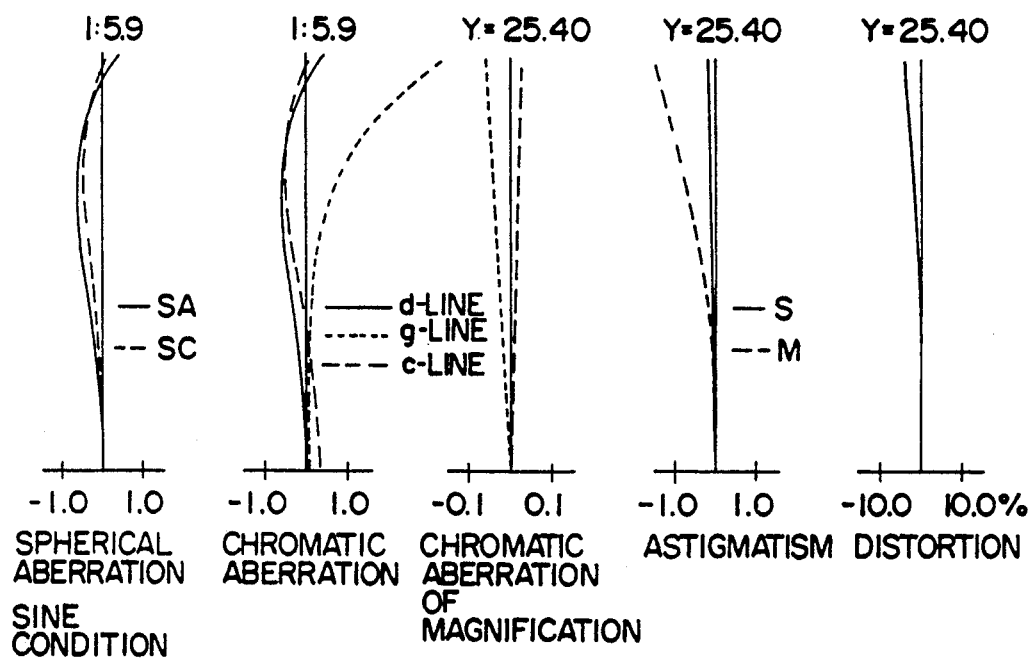
FIG. 47 are various aberration diagrams in a tele side according to the nineteenth embodiment.

Various aberrations in this construction in the wide side are shown in FIG. 46, while aberrations in the tele side are shown in FIG. 47.

TABLE 31

FNo. = 1:4.8∼5.9  f = 80.00∼120.00
m = −0.017∼−0.067  fb = 169.99∼208.22

| Surface number | r | d | n | ν |
|---|---|---|---|---|
| 1 | −39.026 | 3.00 | 1.74320 | 49.3 |
| 2 | −1093.392 | 11.65 | | |
| 3 | −45.075 | 5.18 | 1.78472 | 25.7 |
| 4 | −35.262 | variable | | |
| 5 | 75.235 | 2.50 | 1.78472 | 25.7 |
| 6 | 37.524 | 9.00 | 1.61720 | 54.0 |
| 7 | −141.732 | | | |

TABLE 32

| | f = 80.00 | f = 120.00 |
|---|---|---|
| (object distance ∞) | (d4 = 82.12) | (d4 = 40.02) |
| m = −0.017 × | d4 = 84.31 | — |
| m = −0.067 × | — | d4 = 45.88 |

EMBODIMENT 20

Figure 48:
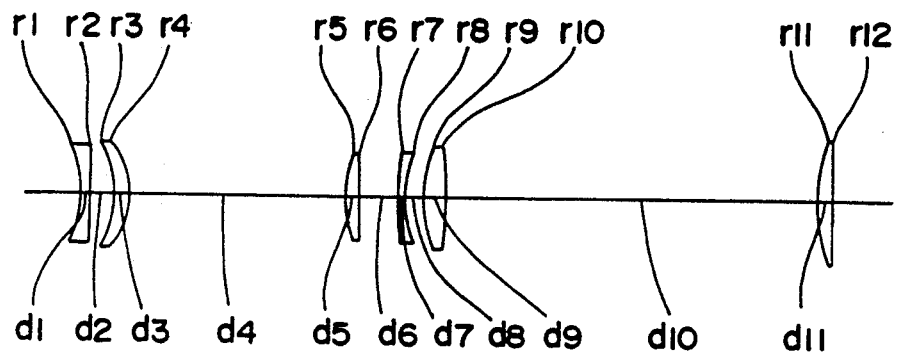
FIG. 48 is a sectional view of a lens in a wide side according to a twentieth embodiment.

FIG. 48 shows a variable power magnifying projecting lens of a twentieth embodiment according to the present invention. Concrete numerical constructions are as shown in Table 33.

Reference character dc denotes a distance between a minifying side surface and the surface to-be-projected. The reference characters fw and fbw in the tables indicate the focal length and the back focus except for the condenser lens. The reference characters fh and fbh denote values of the whole system. The back focus fbh is equal to (d10+d11+dc).

Figure 49:
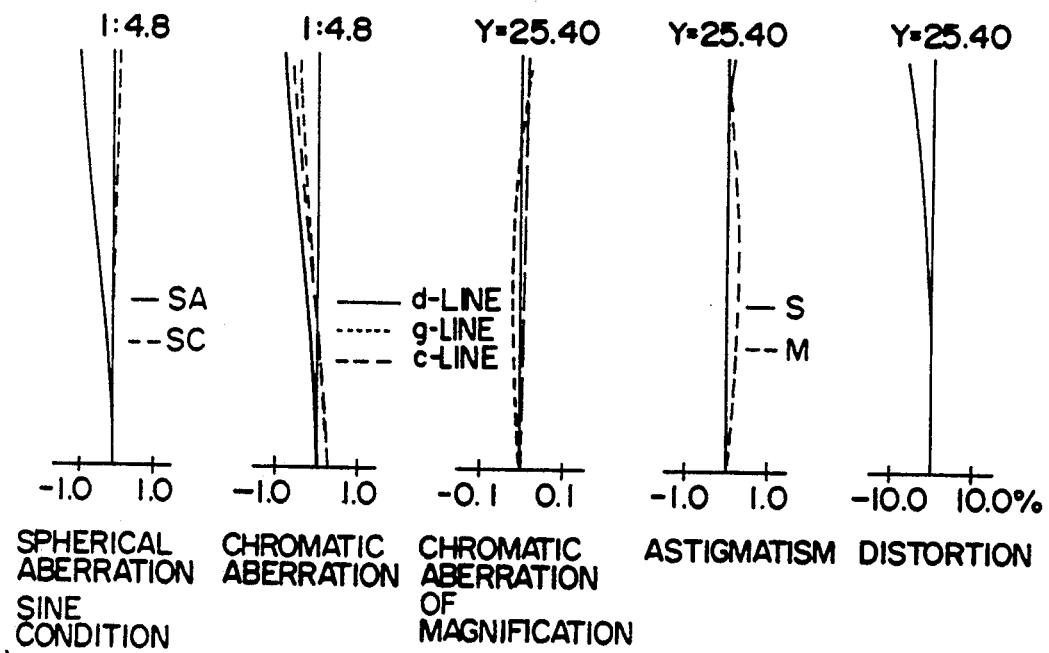
FIG. 49 are various aberration diagrams in the wide side according to the twentieth embodiment.
Figure 50:
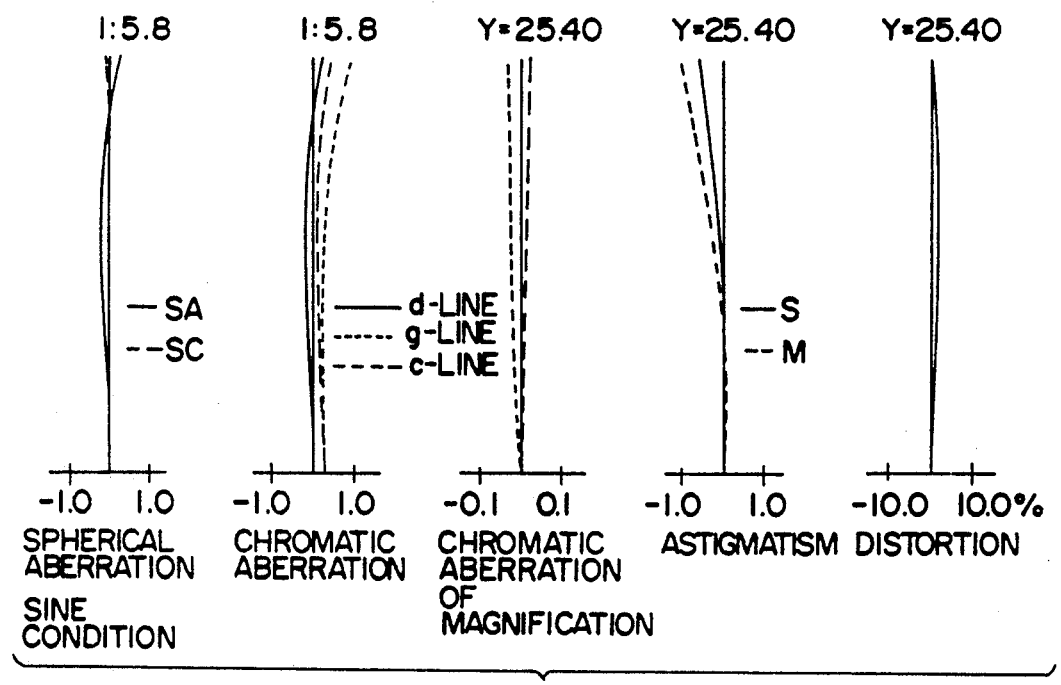
FIG. 50 are various aberration diagrams in a tele side according to the twentieth embodiment.

Various aberrations in this construction in the wide side are shown in FIG. 49, while aberrations in the tele side are shown in FIG. 50.

In this embodiment, the condenser lens, which is shown in FIG. 48 as r11 and r12, is fixed apart from the projecting lens, which is shown as r1 to r10. The condenser lens is disposed near the surface to-be-projected. The dichroic mirror is disposed between the projecting lens and the condenser lens.

The condenser lens is made from plastic and both surfaces thereof are aspherical. The aspherical surface coefficients are as shown in Table 34.

Distance d4 and d10 change according to the change of the focal length, as shown in Table 35.

TABLE 33

FNo. = 1:4.8~5.8   fh = 80.00~120.00
m = −0.017~−0.067   fbh = 175.79~217.78
dc = 10.00   fw = 88.18   fbw = 175.24

| Surface number | r | d | n | ν |
|---|---|---|---|---|
| 1 | −42.085 | 3.00 | 1.70000 | 48.1 |
| 2 | 1582.532 | 10.60 | | |
| 3 | −46.654 | 6.38 | 1.72825 | 28.5 |
| 4 | −36.406 | variable | | |
| 5 | 66.399 | 5.00 | 1.70000 | 48.1 |
| 6 | 297.930 | 16.86 | | |
| 7 | 94.614 | 2.50 | 1.80518 | 25.4 |
| 8 | 42.787 | 8.00 | | |
| 9 | 54.653 | 9.00 | 1.51633 | 64.1 |
| 10 | −330.606 | variable | | |
| 11 | 74.310 | 6.00 | 1.49176 | 57.4 |
| 12 | ∞ | | | |

TABLE 34 eleventh surface
$K = -0.37212671 \times 10^2$   $A4 = 0.42603526 \times 10^5$
$A6 = -0.21429823 \times 10^{-8}$ twelfth surface
$K = 0.0000000$   $A4 = 0.67969290 \times 10^{-6}$
$A6 = 0.00000000$

TABLE 35

| | fh = 80.00 | fh = 120.00 |
|---|---|---|
| (object distance ∞) | (d4 = 90.97) | (d4 = 44.53) |
| | (d10 = 159.79) | (d10 = 204.78) |
| m = −0.017 × | d4 = 93.47 | — |
| | d10 = 159.79 | — |
| m = −0.067 × | — | d4 = 51.21 |
| | — | d10 = 204.78 |

EMBODIMENT 21

Figure 51:
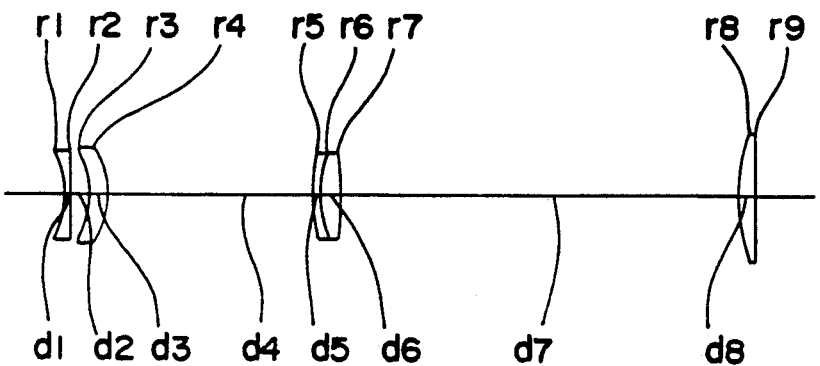
FIG. 51 is a sectional view of a lens in a wide side according to a twenty-first embodiment.

FIG. 51 shows a variable power magnifying projecting lens of a twenty-first embodiment according to the present invention. Concrete numerical constructions are as shown in Table 36.

Figure 52:
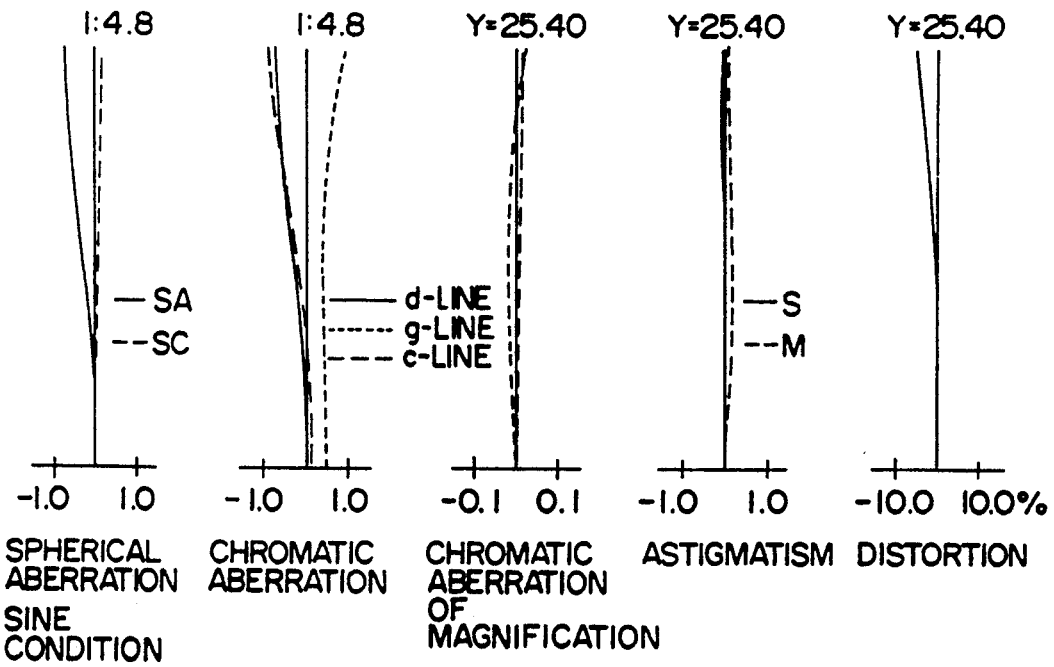
FIG. 52 are various aberration diagrams in the wide side according to the twenty-first embodiment.
Figure 53:
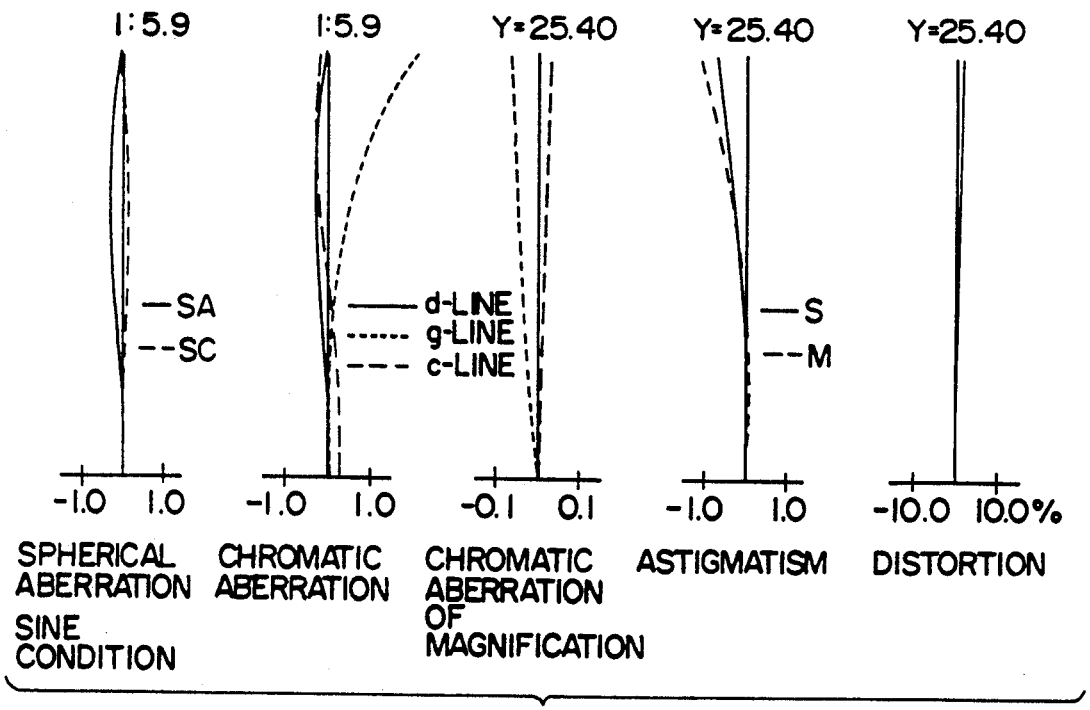
FIG. 53 are various aberration diagrams in a tele side according to the twenty-first embodiment.
Figure 54:
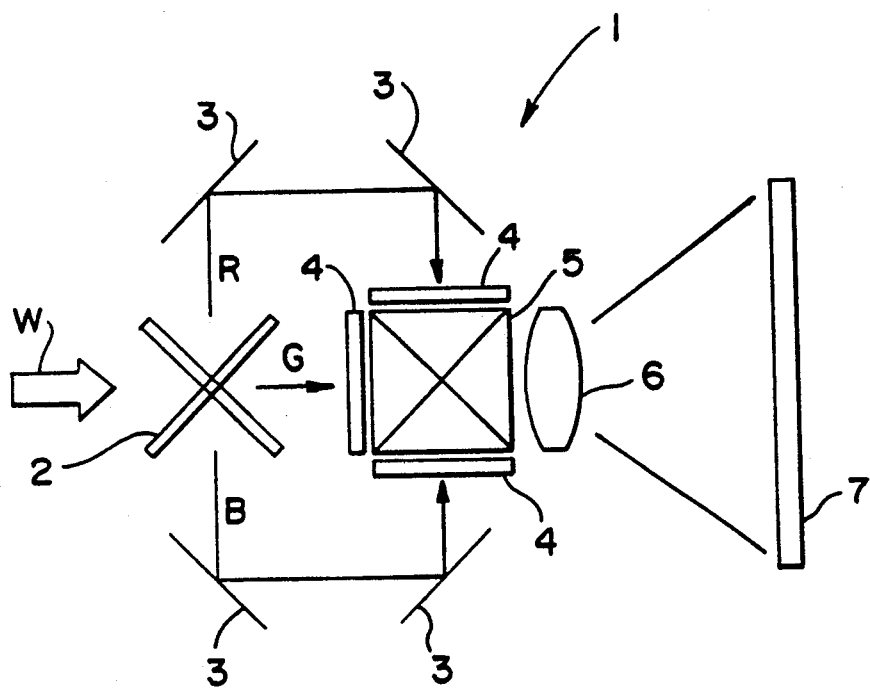
FIG. 54 shows an optical system of a projector using a dichroic prism.
Figure 55:
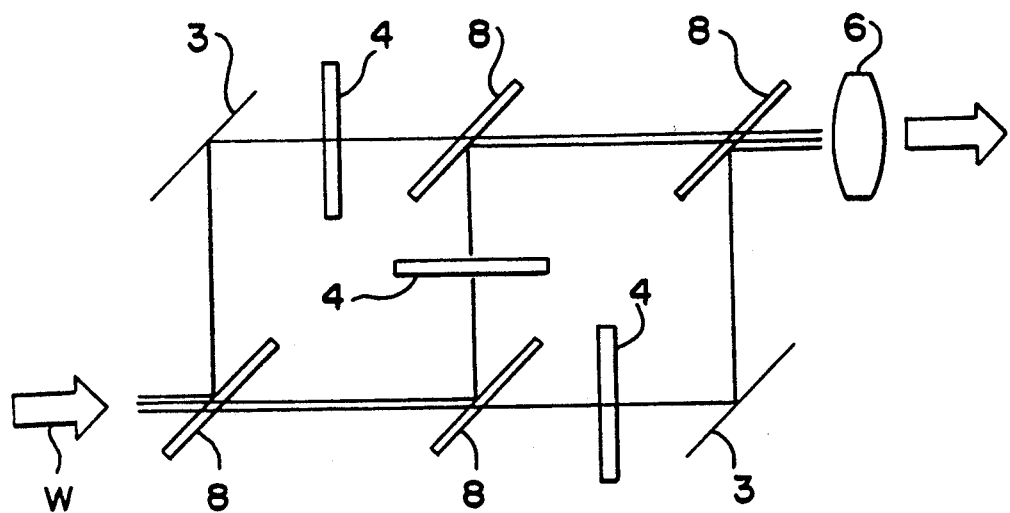
FIG. 55 shows an optical system of a projector using a dichroic mirror.

Various aberrations in this construction in the wide side are shown in FIG. 52, while aberrations in the tele side are shown in FIG. 53.

In this embodiment, the condenser lens, which is shown in FIG. 51 as r8 and r9, is fixed apart from the projecting lens, which is shown as r1 to r7.

The condenser lens is made from plastic, and both surfaces thereof are aspherical. The aspherical surfaces coefficients are as shown in Table 37.

Distance d4 and d7 change according to the change of the focal length, as shown in Table 38.

TABLE 36

FNo. = 1:4.8~5.9   fh = 80.00~120.00
m = −0.017~−0.067   fbh = 181.92~223.28
dc = 10.04   fw = 90.13   fbw = 183.48

| Surface number | r | d | n | ν |
|---|---|---|---|---|
| 1 | −42.809 | 3.00 | 1.71300 | 53.8 |
| 2 | −1075.258 | 7.00 | | |
| 3 | −43.782 | 7.81 | 1.80518 | 25.4 |
| 4 | −37.344 | variable | | |
| 5 | 97.327 | 2.50 | 1.80518 | 25.4 |
| 6 | 39.360 | 9.00 | 1.70000 | 48.1 |
| 7 | −164.662 | variable | | |
| 8 | 64.447 | 7.00 | 1.49176 | 57.4 |

TABLE 36-continued

FNo. = 1:4.8~5.9   fh = 80.00~120.00
m = −0.017~−0.067   fbh = 181.92~223.28
dc = 10.04   fw = 90.13   fbw = 183.48

| Surface number | r | d | n | ν |
|---|---|---|---|---|
| 9 | ∞ | | | |

TABLE 37 eleventh surface
$K = -0.20210812 \times 10^2$   $A4 = 0.45398975 \times 10^{315}$
$A6 = -0.22885244 \times 10^{-8}$ twelfth surface
$K = 0.00000000$   $A4 = 0.67969290 \times 10^{-6}$
$A6 = 0.00000000$

TABLE 38

| | fh = 80.00 | fh = 120.00 |
|---|---|---|
| (object distance ∞) | (d4 = 82.73) | (d4 = 39.97) |
| | (d7 = 164.88) | (d6 = 206.24) |
| m = −0.017 × | d4 = 85.35 | — |
| | d7 = 164.88 | — |
| m = −0.067 × | — | d4 = 46.96 |
| | — | d4 = 206.24 |

Table 39 shows values of conditions (6) to (10) for embodiments 11 to 21. Table 40 shows values of conditions (4) and (5) for embodiments 20 and 21.

TABLE 39

| EMBODIMENTS | CONDITIONS | | | | |
|---|---|---|---|---|---|
| | (6) fbw/fw | (7) Lw/fw | (8) \|f12\|/fw | (9) D12/D23 | (10) d0/fw |
| 11 | 2.13 | 2.57 | 1.36 | 0.07 | — |
| 12 | 1.88 | 2.29 | 1.23 | 0.02 | — |
| 13 | 2.13 | 2.30 | 1.23 | 0.07 | — |
| 14 | 2.13 | 2.47 | 1.37 | 0.07 | — |
| 15 | 2.13 | 2.44 | 1.35 | 0.07 | — |
| 16 | 1.88 | 2.25 | 1.23 | 0.03 | — |
| 17 | 2.04 | 2.28 | 1.26 | 0.75 | 0.87 |
| 18 | 2.13 | 1.96 | 1.28 | 0.27 | 0.94 |
| 19 | 2.13 | 1.42 | 1.29 | 0.14 | 0.64 |
| 20 | 1.99 | 1.73 | 1.37 | 0.12 | 0.57 |
| 21 | 2.04 | 1.24 | 1.40 | 0.08 | 0.75 |

TABLE 40

| EMBODIMENTS | CONDITIONS | |
|---|---|---|
| | (4) fc/fb | (5) rc/fc |
| 20 | 0.863~0.695 | 0.492 |
| 21 | 0.722~0.591 | 0.492 |

What is claimed is:

1. A magnifying projecting lens, comprising a negative first lens group, a positive second lens group and a positive third lens group arranged in this order from a magnifying side, wherein the following condition is satisfied:

fb/f > 1.7, wherein fb equals a back focus when an object distance of the projecting lens is ∞; and f equals a focal length of the projecting lens, and wherein said projecting lens further comprises a positive condenser lens that is disposed nearer a surface to-be-projected than to said third lens group, wherein the following condition is satisfied:

$0.3 < fc/fb < 1.5$, wherein
- fb equals a back focus, except for said condenser lens, when an object distance is ∞; and
- fc equals a focal length of said condenser lens of said condenser lens.

2. A magnifying projecting lens according to claim 1, wherein the following condition is satisfied:

$L/f < 3.5$, wherein
- L equals an overall length of the projecting lens; and
- f equals a focal length of the projecting lens.

3. A magnifying projecting lens according to claim 1, wherein the following condition is satisfied:

$D12/D23 < 1.0$, wherein
- D12 equals a distance between said first lens group and said second lens group; and
- D23 equals a distance between said second lens group and said third lens group.

4. A magnifying projecting lens according to claim 1, wherein said first lens group comprises at least one negative lens, said second lens group comprises a positive lens, and said third lens group comprises a positive lens and a negative lens.

5. A magnifying projecting lens according to claim 1, wherein said condenser lens is disposed in such a manner as to turn a strong positive curvature surface toward said magnifying side, and the following condition is satisfied:

$0.3 < rc/fc < 1.0$, wherein
- rc equals a radius of curvature of said positive surface; and
- fc equals a focal length of said condenser lens.

6. A magnifying projecting lens according to claim 1, wherein at least one surface of said condenser lens is aspherical.

7. A magnifying projecting lens according to claim 1, wherein said condenser lens is made from plastic.

8. A variable power magnifying projecting lens comprising a negative first lens group, a positive second lens group and a positive third lens group having a positive lens and a negative lens, each group being arranged in this order from a magnifying side, wherein a focal length is changed by changing a distance between said second lens group and said third lens group and moving the whole system with respect to an image projected by said projecting lens, the following condition being satisfied:

$fbw/fw > 1.7$, wherein
- fbw equals a back focus in a wide side when an object distance is ∞; and
- fw equals a focal length in wide side.

9. A variable power magnifying projecting lens according to claim 8, wherein the following condition is satisfied:

$Lw/fw < 3.0$, wherein
- Lw equals an overall length of said lens in a wide side; and
- fw equals a focal length of said lens in said wide side.

10. A variable power magnifying projecting lens according to claim 8, wherein the following condition is satisfied:

$0.7 < |f12|/fw < (ft/fw) \cdot 1.5$, wherein
- f12 equals a composed focal length of said first lens group and said second lens group of said lens; and
- fw and ft equals focal lengths of the whole system in said wide side and in said tele side respectively.

11. A variable power magnifying projecting lens according to claim 8, wherein the following condition is satisfied:

$D12/D23 < 1.0$, wherein
- D12 equals a distance between said first lens group and said second lens group of said lens; and
- D23 equals a distance between said second lens group and said third lens group of said lens.

12. A variable power magnifying projecting lens according to claim 8, wherein the following condition is satisfied:

$r1 < 0$, wherein
- r1 equals a radius of curvature of a most magnifying side surface of said first lens group.

13. A variable power magnifying projecting lens according to claim 8, wherein said first lens group comprises a negative lens, and said second lens group comprises a positive lens.

14. A variable power magnifying projecting lens according to claim 8, wherein said third lens group comprises a positive lens and a negative lens.

15. A variable power magnifying projecting lens according to claim 8, further comprising a positive condenser lens that is disposed near a surface to-be-projected, and wherein the following condition is satisfied:

$0.3 < fc/fb < 1.5$, wherein
- fb equals a back focus, except for said condenser lens, when an object distance is ∞; and
- fc equals a focal length of said condenser lens.

16. A variable power magnifying projecting lens according to claim 15, wherein said condenser lens is disposed in such a manner as to turn a strong positive curvature surface toward said magnifying side, and the following condition is satisfied:

$0.3 < rc/fc < 1.0$, wherein
- rc equals a radius of curvature of said positive surface of said lens; and
- fc equals a focal length of said condenser lens.

17. A variable power magnifying projecting lens according to claim 15, wherein at least one surface of said condenser lens is aspherical.

18. A variable power magnifying projecting lens according to claim 15, wherein said condenser lens is made from plastic.

19. A variable power magnifying projecting lens according to claim 8, wherein an aperture diaphragm moves with said third lens group.

20. A variable power magnifying projecting lens according to claim 8, wherein a distance between an aperture diaphragm and said third lens group changes according to a change of power of said lens.

21. A variable power magnifying projecting lens, comprising a negative front lens group, having a positive lens and a negative lens, and a positive rear lens group arranged in this order from a magnifying side, wherein a focal length is changed by changing a distance between said front lens group and said rear lens group and moving the whole system with respect to an image projected by said projecting lens, and the following conditions are satisfied:

$$fbw/fw > 1.7, \text{ and}$$

$$Lw/fw < 3.0,$$

wherein
fbw equals a back focus in a wide side when an object distance is ∞;
fw equals a focal length of said lens in said wide side; and
Lw equals an overall length of said lens in said wide side.

22. A variable power magnifying projecting lens comprising a negative front lens group, and a positive rear lens group, said rear lens group consisting of a positive lens and a negative lens, each lens group being arranged in this order from a magnifying side, wherein a focal length is changed by changing a distance between said front lens group and said rear lens group and moving the whole system with respect to image projected by said projecting lens.

23. A variable power magnifying projecting lens according to claim 22, said front lens group comprising a positive lens and a negative lens.

24. A variable power magnifying projecting glens according to claim 22, wherein the following conditions are satisfied:

$$fbw/fw > 1.7, \text{ and}$$

$$Lw/fw < 3.0,$$

wherein
fbw equals a back focus of said lens in a wide side when an object distance is ∞;
fw equals a focal length of said lens in said wide side; and
Lw equals an overall length of said lens in said wide side.

25. A variable power magnifying projecting glens according to claim 22, wherein the following condition is satisfied:

$$0.7 < |f12|/fw < (ft/fw) \cdot 1.5,$$

wherein f12 equals a focal length of said front lens group of said lens; and
fw and ft equals focal lengths of the whole system in a wide side and in a tele side.

26. A variable power magnifying projecting lens according to claim 22, wherein the following condition is satisfied:

$$Fw < Ft,$$

wherein
Fw equals an F-number of said lens in a wide side; and
Ft equals an F-number of said lens in a tele side.

27. A variable power magnifying projecting lens according to claim 22, wherein an aperture diaphragm moves with said rear lens group.

28. A variable power magnifying projecting lens, comprising:
a variable power lens group conprising a negative front lens group having at least one negative lens, and a positive rear lens group having at least one positive lens and one negative lens that are arranged in this order from a magnifying side; wherein a focal length is changed by changing a distance between said front lens group and said rear lens group and moving the whole system with respect to an image projected by said projecting lens;
a positive condenser lens that is disposed in such a manner as to turn a strong positive curvature surface toward said magnifying side; and
the following condition is satisfied:

$$0.3 < fc/fb < 1.5,$$

wherein
fb equals a back focus of said variable power lens, and
fc equals a focal length of said condenser lens.

29. A variable power magnifying projecting lens according to claim 28, wherein said condenser lens is disposed in such a manner as to turn a strong positive curvature surface toward said magnifying side, and the following condition is satisfied:

$$0.3 < rc/fc < 1.0,$$

wherein
rc equals a radius of curvature of said positive surface; and
fc equals a focal length of said condenser lens.

30. A variable power magnifying projecting lens according to claim 28, wherein at least one surface of said condenser lens is aspherical.

31. A variable power magnifying projecting lens according to claim 28, wherein said condenser lens is made from plastic.

32. A variable power magnifying projecting lens according to claim 28, wherein the following condition is satisfied:

$$Fw < Ft,$$

wherein
Fw equals an F-number in a wide side; and
Ft equals an F-number in a tele side.

33. A variable power magnifying projecting lens according to claim 28, wherein an aperture diaphragm moves with said rear lens group.

* * * * *

UNITED STATES PATENT AND TRADEMARK OFFICE
CERTIFICATE OF CORRECTION

PATENT NO. : 5,278,698
DATED : January 11, 1994
INVENTOR(S) : T. IIZUKA et al.

It is certified that error appears in the above-indentified patent and that said Letters Patent is hereby corrected as shown below:

At column 22, line 20 (claim 28, line 3), change "conprising" to ---comprising---.
At column 21, line 47 (claim 24, line 1), change "glens" to ---lens---.
At column 21, line 62 (claim 25, line 1) of the printed patent, change "glens" to ---lens---.

Signed and Sealed this

Thirtieth Day of August, 1994

*Attest:*

BRUCE LEHMAN

*Attesting Officer*  *Commissioner of Patents and Trademarks*